(12) United States Patent
Bonner

(10) Patent No.: US 9,226,152 B2
(45) Date of Patent: Dec. 29, 2015

(54) DYNAMIC DUAL-MODE SERVICE ACCESS CONTROL, LOCATION-BASED BILLING, AND E911 MECHANISMS

(71) Applicant: Wantage Technologies LLC, Wilmington, DE (US)

(72) Inventor: Thomas W. Bonner, Smyrna, GA (US)

(73) Assignee: Wantage Technologies LLC, Wilmington, DE (US)

(*) Notice: Subject to any disclaimer, the term of this patent is extended or adjusted under 35 U.S.C. 154(b) by 123 days.

(21) Appl. No.: 13/856,682

(22) Filed: Apr. 4, 2013

(65) Prior Publication Data

US 2013/0288640 A1 Oct. 31, 2013

Related U.S. Application Data

(63) Continuation of application No. 11/379,022, filed on Apr. 17, 2006, now abandoned, which is a continuation-in-part of application No. 11/159,606, filed on Jun. 23, 2005, now Pat. No. 7,864,673.

(60) Provisional application No. 60/683,992, filed on May 24, 2005.

(51) Int. Cl.

| | |
|---|---|
| H04W 12/06 | (2009.01) |
| H04L 29/06 | (2006.01) |
| H04M 1/253 | (2006.01) |
| H04W 12/08 | (2009.01) |
| H04M 1/725 | (2006.01) |
| H04W 4/02 | (2009.01) |

(Continued)

(52) U.S. Cl.
CPC ............ *H04W 12/06* (2013.01); *H04L 63/102* (2013.01); *H04M 1/2535* (2013.01); *H04M 1/72572* (2013.01); *H04W 12/08* (2013.01); *H04M 1/72536* (2013.01); *H04M 2250/02* (2013.01); *H04M 2250/06* (2013.01); *H04W 4/02* (2013.01); *H04W 8/26* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 5,940,755 | A | 8/1999 | Scott |
| 6,240,285 | B1 | 5/2001 | Blum et al. |

(Continued)

FOREIGN PATENT DOCUMENTS

| | | |
|---|---|---|
| JP | 2004350109 A | 12/2004 |
| WO | WO-0205539 | 1/2002 |
| WO | WO-03075125 A2 | 9/2003 |

OTHER PUBLICATIONS

International Search Report dated Sep. 20, 2007 for PCT Application Serial No. PCT/US/06/19408, 2 Pages.

(Continued)

*Primary Examiner* — Jae Y Lee
*Assistant Examiner* — Tito Pham
(74) *Attorney, Agent, or Firm* — Panitch Schwarze Belisario & Nadel LLP

(57) ABSTRACT

A system that facilitates controlling network access comprises a lookup component that determines a geographic location associated with a public originating IP address, wherein the public originating IP address is associated with a request for dual mode services made by a dual mode client. A comparison component compares the determined geographic location with a retained geographic location associated with the dual mode client and determines whether to enable dual mode services based at least in part upon the comparison.

10 Claims, 24 Drawing Sheets

(51) Int. Cl.
*H04W 8/26* (2009.01)
*H04W 88/06* (2009.01)

(56) References Cited

U.S. PATENT DOCUMENTS

| | | | |
|---|---|---|---|
| 6,457,129 | B2 | 9/2002 | O'Mahony |
| 6,647,426 | B2 | 11/2003 | Mohammed |
| 6,677,894 | B2 | 1/2004 | Sheynblat et al. |
| 6,845,092 | B2 | 1/2005 | Vassilovski et al. |
| 6,853,851 | B1 | 2/2005 | Rautiola et al. |
| 6,925,378 | B2 | 8/2005 | Tzamaloukas |
| 6,975,873 | B1 | 12/2005 | Banks et al. |
| 6,993,319 | B2 | 1/2006 | Himmel et al. |
| 7,433,673 | B1 * | 10/2008 | Everson et al. ............ 455/404.1 |
| 7,603,102 | B1 | 10/2009 | Pryor |
| 7,864,673 | B2 | 1/2011 | Bonner |
| 2002/0126701 | A1 | 9/2002 | Requena |
| 2002/0157007 | A1 | 10/2002 | Sashihara |
| 2003/0051041 | A1 | 3/2003 | Kalavade et al. |
| 2003/0069974 | A1 | 4/2003 | Lu et al. |
| 2003/0131023 | A1 | 7/2003 | Bassett et al. |
| 2003/0156566 | A1 | 8/2003 | Griswold et al. |
| 2003/0176186 | A1 | 9/2003 | Mohammed |
| 2003/0225893 | A1 | 12/2003 | Roese et al. |
| 2004/0111640 | A1 | 6/2004 | Baum |
| 2004/0125781 | A1 | 7/2004 | Walter et al. |
| 2004/0174900 | A1 | 9/2004 | Volpi et al. |
| 2004/0192211 | A1 | 9/2004 | Gallagher et al. |
| 2004/0203910 | A1 | 10/2004 | Hind et al. |
| 2004/0224682 | A1 | 11/2004 | Kang |
| 2004/0259541 | A1 | 12/2004 | Hicks et al. |
| 2005/0026650 | A1 | 2/2005 | Russell |
| 2005/0122921 | A1 | 6/2005 | Seo |
| 2005/0147247 | A1 | 7/2005 | Westberg et al. |
| 2005/0148353 | A1 | 7/2005 | Hicks et al. |
| 2005/0181805 | A1 * | 8/2005 | Gallagher ................. 455/456.1 |
| 2005/0232211 | A1 | 10/2005 | Abhishek et al. |
| 2005/0239441 | A1 | 10/2005 | Eronen |
| 2005/0266859 | A1 | 12/2005 | Tejani et al. |
| 2006/0002189 | A1 | 1/2006 | Berkman |
| 2006/0004643 | A1 * | 1/2006 | Stadelmann et al. ........... 705/34 |
| 2006/0094431 | A1 | 5/2006 | Saifullah et al. |
| 2006/0236378 | A1 * | 10/2006 | Burshan ........................ 726/4 |
| 2007/0198835 | A1 | 8/2007 | Mudhar |
| 2007/0238448 | A1 | 10/2007 | Gallagher et al. |
| 2008/0125120 | A1 | 5/2008 | Gallagher et al. |

OTHER PUBLICATIONS

International Search Report dated Sep. 21, 2006 for PCT Application Serial No. PCT/US06/19258, 3 Pages.
OA dated Apr. 13, 2009 for U.S. Appl. No. 11/379,022, 21 pages.
OA dated Jan. 6, 2010 for U.S. Appl. No. 11/379,022, 22 pages.
OA dated Oct. 6, 2008 for U.S. Appl. No. 11/379,022 28 pages.
OA dated Jun. 9, 2010 for U.S. Appl. No. 11/379,022, 24 pages.
OA dated Feb. 9, 2009 for U.S. Appl. No. 11/159,606, 29 pages.
OA dated Sep. 30, 2009 for U.S. Appl. No. 11/159,606, 49 pages.
Oa dated Aug. 6, 2008 for U.S. Appl. No. 11/159,606, 47 pages.
OA dated Apr. 27, 2010 for U.S. Appl. No. 11/159,606, 39 pages.
European Search Report dated May 26, 2011 for European Application Serial No. 06760167.4-2412/1884087, 1 page.
Japanese Office Action mailed Aug. 19, 2011 for JP Application Serial No. 2008-513548, 2 pages.
Japanese Office Action mailed Aug. 26, 2011 for JP Application Serial No. 2008-513559, 5 pages.
"UMA Architecture (Stage 2) R1.0.4 1-20 (May 2, 2005); Unlicensed Mobile Access (UMA); Architecture (Stage 2)", UMA Architecture (Stage 2) R1.0.4, May 2, 2005.
European Search Report dated May 9, 2011 for European Application Serial No. 06760167.4, 13 pages.
European Search Report dated Jun. 8, 2011 for European Application Serial No. 06770572.3, 10 pages.
Unlicensed Mobile Access UMS: "UMA Architecture (Stage 2) R1.0.2, Unlicensed Mobile Access (UMA); Architecture (stage 2)", Internet Citation, Nov. 3, 2004, XP002463278, Retrieved from the Internet: URL: http://www.umatechnology.org.
Grech S et al:"Implications of Unlicensed Mobile Access (UMA) for GSM security", Security and Privacy for Emerging Areas in Communications Networks, 2005. Securecomm 2005. First International Conference on Athens, Greece Sep. 5-9, 2005, Piscataway, NJ, USA, IEEE, Sep. 5, 2005.

* cited by examiner

| IMSI | IP ADDRESS | BROADBAND ID | LOCATION |
|---|---|---|---|

*FIG. 11*

| IMSI | IP ADDRESS | BROADBAND ID | LOCATION BILLING CODE | LOCATION ADDRESS | LOCATION GEO COORDINATES |
|---|---|---|---|---|---|

*FIG. 12*

DYNAMIC DUAL-MODE SERVICE ACCESS CONTROL, LOCATION-BASED BILLING, AND E911 MECHANISMS

CROSS-REFERENCE TO RELATED APPLICATIONS

This application is a Continuation of U.S. Ser. No. 11/379,022, filed on Apr. 27, 2006, which is a Continuation in Part of U.S. patent application Ser. No. 11/159,606, filed on Jun. 23, 2005, now U.S. Pat. No. 7,864,673 and entitled DYNAMIC DUAL-MODE SERVICE ACCESS CONTROL, LOCATION-BASED BILLING, AND E911 MECHANISMS, which in turn claims the benefit of U.S. Provisional Patent application Ser. No. 60/683,992 entitled DYNAMIC DUAL-MODE SERVICE ACCESS CONTROL, LOCATION-BASED BILLING, AND E911 MECHANISMS and filed May 24, 2005. The entireties of these applications are incorporated herein by reference.

TECHNICAL FIELD

This invention relates to multimode services in a cellular network, and more specifically, to access control with respect to one or more access points.

BACKGROUND

The rapid advances and convergence of cellular and IP technologies poses many new challenges for a provider in terms of not only meeting consumer demands for IP and cellular services, but also in ensuring that such services are not compromised such that the provider loses revenue. Broadband communications carriers (e.g., DSL-Digital Subscriber Line and cable television systems) are continually offering increased bandwidth for data downloads and uploads to subscribers over the Internet as a means of not only providing data services for the ever-demanding multimedia technologies, but also for voice communications utilizing VoIP (voice over IP).

Conventionally, in the context of a DSL and wireless application, a DSL or cable modem can be provided to connect to a broadband carrier. Typically, the DSL modem includes at least one port for receiving a WiFi access point (AP). WiFi, or Wireless Fidelity, is defined according to standards by IEEE 802.11 (a, b, g, etc.), and allows connection to the Internet from a couch at home, a bed in a hotel room, or a conference room at work, without wires. WiFi is similar to technology used in a cell phone that enables such devices, e.g., computers, to send and receive data indoors and out; anywhere within the range of a base station. In order to access the broadband services, a Point-to-Point Protocol over Ethernet (PPPoE) authentication service is provided so that the subscriber, via a handset, can access the wide area network link.

Unlicensed Mobile Access (UMA) technology provides access to GSM (Global System for Mobile Communications) and GPRS (General Packet Radio Service) mobile services over unlicensed spectrum technologies (e.g., Bluetooth™ and IEEE 802.11x media). UMA technology provides alternative access to the GSM and GPRS core network services via IP-based broadband connections. Utilizing UMA, subscribers are able to roam and experience handover between cellular networks and public/private unlicensed wireless networks using multi-mode (e.g., dual-mode) mobile handsets, thereby receiving a consistent user experience when moving between networks.

In operation, a mobile subscriber with a UMA-enabled, dual-mode handset moves into range of an unlicensed wireless network to which the handset is allowed to connect. When the connection is made, the handset contacts a UNC (UMA Network Controller) over the broadband IP access network to be authenticated and authorized for GSM voice and GPRS data services via the unlicensed network. When approved, the subscriber's current location data stored in the core network is updated. From that point forward, all mobile voice and data traffic is routed to the handset via a UMAN (UMA Network) rather than the cellular radio access network. When the subscriber moves outside the range of the unlicensed network to which they are connected, the UNC and handset facilitate connection back to the licensed outdoor network, the whole process of which is transparent to the user.

The access point (AP) in the broadband service is transparent to the UMA technology. As long as the UMA client has an IP connection, and has a destination address, signaling can flow from the handset to the UNC, and login can occur. A secure tunnel is then established from the UNC back to the client and the GSM authentication procedures can be initiated to the UNC and access allowed. The UNC (and/or using WiFi) does not provide authentication, does not validate, and cannot determine the physical location of the handset. Thus, it is possible for a subscriber to take a WiFi AP and the DSL modem to another location (e.g., a neighbor's house) and make the connection from the other location without the DSL carrier ever knowing, thereby circumventing revenues to the carrier. This also has a negative impact with respect to E911 services where the location of the subscriber is desired to be known.

SUMMARY

The following presents a simplified summary in order to provide a basic understanding of some aspects of the claimed subject matter. This summary is not an extensive overview, and it is not intended to identify key/critical elements of the claimed subject matter or to delineate the scope thereof. Its sole purpose is to present some concepts in a simplified form as a prelude to the more detailed description that is presented later.

The claimed subject matter relates to limiting a subscriber's ability to utilize access points to bypass wireless radio networks (and avoid fees). More particularly, dual mode services enable a multi-mode device to utilize a broadband network to send and receive data. When, for instance, a dual mode device is within range of an access point to a broadband network (e.g., a wireless router), a request can be made to route voice and data related to the dual mode device over the broadband network (rather than, for instance, a GSM network). Often, utilizing broadband (e.g., VoIP) results in reduced cost to subscribers, rendering it desirable for such subscriber to utilize the broadband network.

When the dual mode device detects signals associated with an access point (e.g., WiFi signals, Bluetooth signals, . . . ), such device can access a broadband network by way of the access point and undertake an authorization/authentication procedure with respect to the access point. In more detail, an IP data packet can be provided to a component that is maintained by a wireless service provider associated with the dual mode client, such as a GSM network provider. The IP data packet can include, amongst other things, a public originating IP address that is associated with a broadband network provider, a MAC address assigned to the access point, and data that identifies the dual mode device.

To determine whether the multi-mode device is authorized to utilize dual-mode services, an approximate geographic location of the dual-mode device can be ascertained. For example, the public originating IP address can be utilized to search for a street address of the owner of such address (e.g., the IP service provider). The MAC address and the ascertained address can be compared with an authorized MAC address and street address (or city, county, . . . ). If the MAC address of the access point and the discerned approximate geographic location do not match an authorized MAC address and geographic location (retained within a database of the wireless network provider), dual-mode services will not be enabled. Rather, the multi-mode device will continue to utilize a radio access network to send/receive data (e.g., phone calls, pictures, . . . ). If the MAC address of the access point and the discerned approximate geographic location match an authorized MAC address and geographic location (with respect to the dual-mode device), then dual-mode services will be enabled. In other words, data associated with the dual-mode device will be routed by way of a broadband network.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIGS. 11 and 12 illustrate examples of record formats that can be employed.

DETAILED DESCRIPTION

Figure 1:
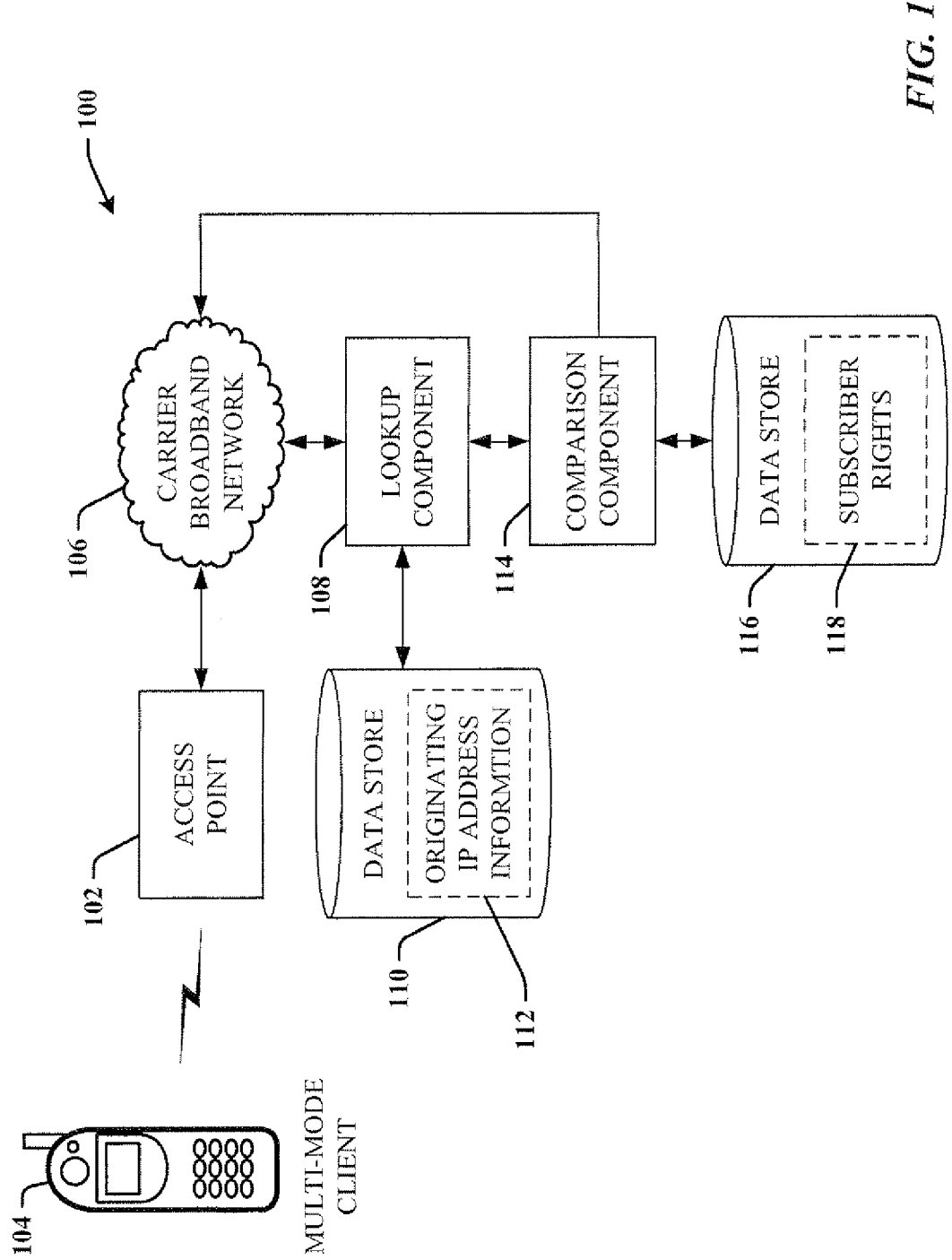
FIG. 1 is a high-level block diagram of a system that facilitates controlling use of access points to access dual mode services.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate a description of the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The claimed subject matter relates to restricting a user to certain, authorized access points in connection with utilizing dual mode services. Conventionally, a wireless network provider (e.g., a GSM network provider) associates a MAC address with a subscriber, and allows the subscriber to bypass the GSM network so long as the MAC address associated with the access point matches the authorized MAC address assigned to the subscriber. A user could easily change location of the access point, however, and circumscribe systems for managing where users are authorized to use WiFi, for example, to access dual-mode services (e.g., bypass a GSM network through utilization of a packet-switched network). In a detailed example, a user that travels between countries may simply take their router with them (which can include a retained MAC address) and use dual-mode services to avoid paying international roaming fees. Such a scenario can result in significant loss of revenue to a wireless network provider (as well as increased costs to customers who utilize dual-mode services as intended by the wireless service provider).

Described herein is a service-provider perspective on managing where subscribers may use WiFi, Bluetooth, etc. to access DMS (dual-mode services) as well as limiting access points that subscribers can employ to access DMS. For the purpose of illustrating this concept, the DMS technology can be UMA (unlicensed mobile access), IMS (IP multimedia subsystem) VoIP, or any other suitable system/protocol. This service-provider perspective offers a concept to build upon existing UMA and broadband security procedures to enable a UNC-SGW (UMA network controller-security gateway) to validate the public originating IP address of a UMA client. In one solution, the physical location of the broadband endpoint is used to control DMS access, provide dynamic location based billing, and dynamically comply with E911 regulations. Additionally, the claimed subject matter can apply to DSL broadband networks, cable modem networks, WiMAX-based broadband networks, or any other suitable broadband networks.

In one implementation, the DMS does not restrict the physical endpoint. The broadband service and RBGW (residential broadband gateway) are transparent to the DMS. Note that for the purposes of illustrating the innovation, the DMS technology will be described in the context of UMA, but can also be IMS VoIP technology.

Turning specifically to FIG. 1, a system 100 that enables restriction to one or more access points in connection with DMS is illustrated. The system 100 includes an access point 102, which can be, for instance, a wireless router, a repeater, or any other suitable device that enables a portable device to access DMS. For example, the access point 102 can communicate by way of WiFi, Bluetooth, or any other suitable protocol. A multi-mode client 104 can utilize the access point 102 to connect to a carrier broadband network 106, such as one that is provided by a cable service provider, a DSL network, a WiMAX-enabled network, or any other suitable broadband network. The carrier broadband network 106 can be utilized to communicatively couple the multi-mode client 104 to a lookup component 108 that is maintained by a wireless network provider, such as a GSM network provider. The lookup component 108 can be utilized in connection with authentication and authorization of the multi-mode client 104 with respect to, for instance, GSM voice and/or GPRS data services. If approved, all mobile voice and data traffic can be routed to the multi-mode client 104 over, for instance, a UMA network instead of the wireless network (radio access network).

During service registration, when the multi-mode client 104 goes through the process of authenticating itself and establishing a secure IP tunnel with a GSM network, the multi-mode client 104 provides the GSM network with one or more IP packets. Within at least one of the packets (e.g., in a packet header) a public originating IP address can be provided. In more detail, an IP service provider that provides access to a broadband network with respect to the access point 102 will be associated with various IP addresses that can be assigned to users of the carrier broadband network 106. Each of the IP addresses maps to a service provider and a location of such service provider. The multi-mode client 104 can additionally provide a MAC address of the access point 102 when undergoing authentication and authorization.

The lookup component 108 can receive the public originating IP address and determine an originating location of the IP address (e.g., a geographic location of an IP service provider associated with the IP address). For instance, the lookup component 108 can access a data store 110 that includes public originating IP address information 112. Pursuant to an example, contents of the data store 110 can be indexed according to IP address, such that a physical address of an IP provider associated with the public originating IP address can be determined.

The lookup component 108 can be communicatively coupled to a comparison component 114, which can access a data store 116 that includes data relating to subscriber rights 118. More particularly, the data store 116 can include subscribers, authorized MAC addresses associated with the subscribers, and authorized locations with respect to DMS. Pursuant to an example, the comparison component 114 can receive data that identifies a subscriber associated with the multi-mode client 104, and can then retrieve authorized MAC addresses and geographic locations (e.g., cities) associated with the subscriber. The lookup component 108 can provide the geographic location associated with the public originating IP address to the comparison component 114, which can compare such location with the location within the subscriber rights 118 of the data store 116. If the comparison component 114 determines that the location ascertained by the lookup component 108 matches that within the data store 116, then the multi-mode client 104 will be authorized to utilize DMS (e.g., utilize a packet-switched network for voice and data delivery and reception).

If the comparison component 114 discerns that the location associated with the public originating IP address within the IP data packet provided by the multi-mode client 104 is different from authorized location(s) within the data store 116, then the comparison component 114 can be utilized in connection with denying use of DMS. For example, the multi-mode client 104 can be forced to utilize a radio access network (such as a GSM network) for voice and data transmittal (and incur fees associated with use of such network). The comparison component 114 can inform the multi-mode client 104 of the prevention of access by way of the carrier broadband network 106. The comparison component 114, if desired, can additionally compare a MAC address associated with the access point 102 with an authorized MAC address, and can prevent use of DMS if the two MAC addresses do not correspond.

Figure 2:
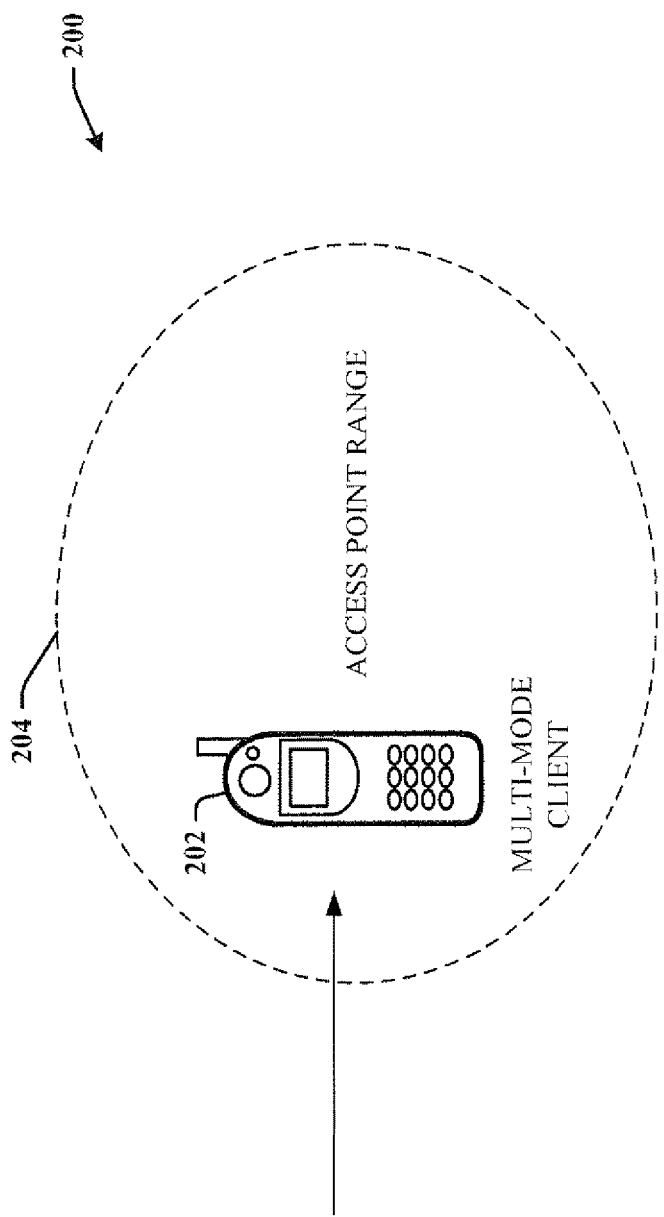
FIG. 2 illustrates a multi-mode client that can utilize a broadband network to send/receive voice data.

Now turning to FIG. 2, an example environment 200 illustrating when a determination can be made regarding authorization of a multi-mode client with respect to DMS is illustrated. A multi-mode client 202 can enter a region where such client 202 can utilize WiFi, Bluetooth, or the like to access a broadband network. Such region is referred to as an access point range 204. Once the multi-mode client enters the access point range 204, it can initiate an authentication and authorization procedure with a wireless service provider. For instance, having phone calls or data routed to a broadband network may be associated with reduced cost to a subscriber when compared with using a GSM network for phone calls and data. The multi-mode client 202 can provide a component maintained by the wireless service provider with an IP data packet that includes the public originating IP address related to a broadband network provider associated with the access point.

The IP data packet can additionally include a MAC address of the access point and data that identifies the subscriber and/or the multi-mode client 202. The public originating IP address can then be provided to a lookup service or component, which can determine a location of the IP address (e.g., location of an IP service provider that owns the IP address). If an authorized location does not correspond to the determined location (from the public originating IP address), the multi-mode client will be denied use of DMS (denied routing of data over a packet-switched network). The procedure can be undertaken each time that the multi-mode client enters the access point range 204 (and is not necessary for each call made by the multi-mode client 202). Thus, if the multi-mode client 202 leaves the access point range 204 and re-enters at a later time, the authorization and authentication procedure repeats upon re-entry.

Figure 3:
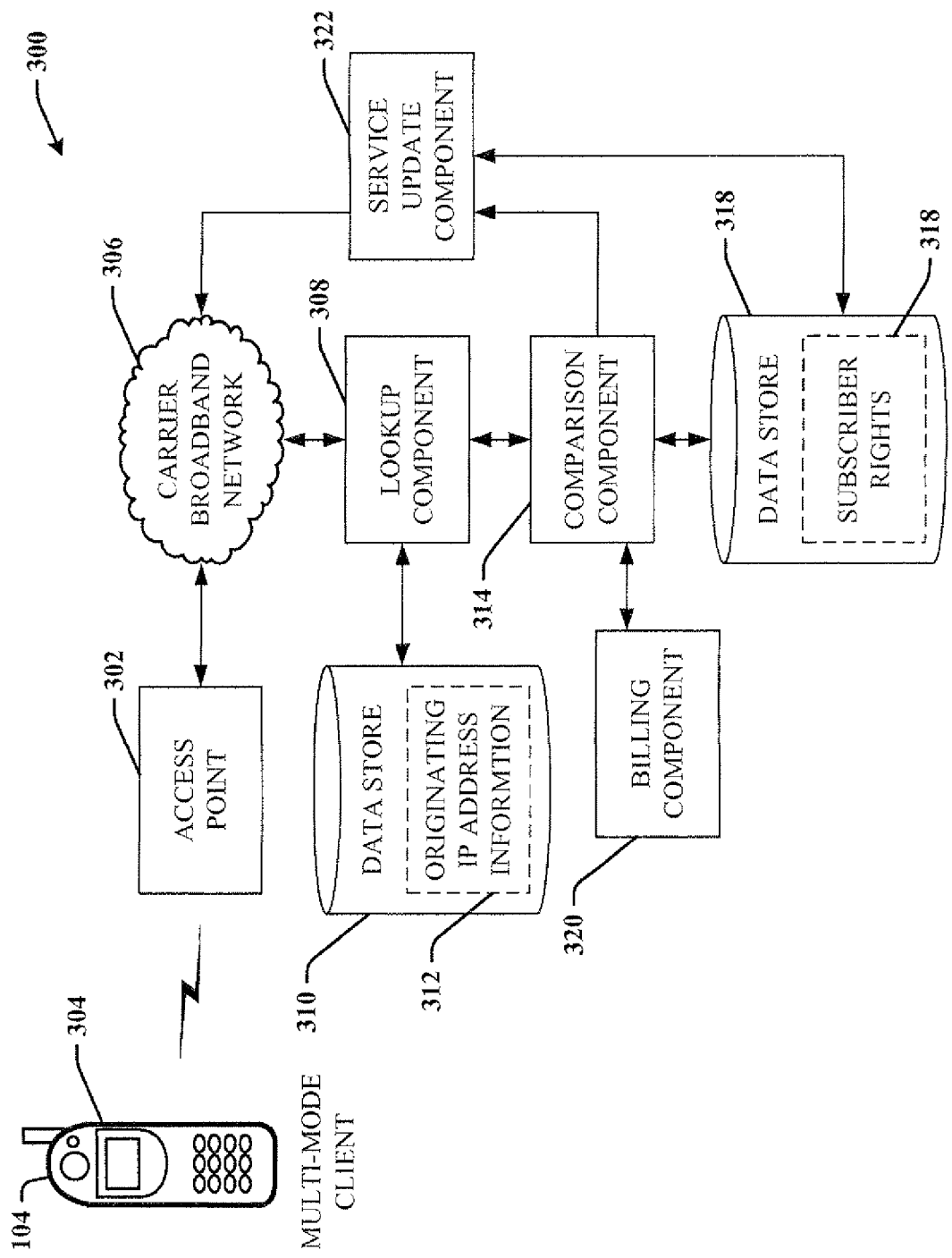
FIG. 3 illustrates a block diagram of a system that facilitates billing a subscriber based at least in part upon an approximated geographic location.

Referring now to FIG. 3, a system 300 that facilitates enforcing restrictions with respect to access points is illustrated. The system 300, like the system 100 (FIG. 1) includes an access point 302 that can emit WiFi, Bluetooth, or other suitable wireless signals. A multi-mode client 304 can detect the signals and utilize the access point 302 to connect to a carrier broadband network 306. The multi-mode client 304 can request authorization to employ dual mode services (e.g., have phone calls and data routed from a GSM network to the carrier broadband network 306). Such request can include provision of an IP data packet to a lookup component 308 maintained by a wireless service provider (e.g., a GSM network provider), wherein the IP data packet can include a public originating IP address that is associated with the access point 302 (as well as a MAC address of the access point 302) and data that identifies the multi-mode client 304 or a subscriber associated therewith. The lookup component 308 can search a data store 310 that includes public originating IP address information 312 through use of the public originating IP address within the IP data packet. For instance, a location of an IP service provider can be determined upon receipt of the public originating IP address.

The location of the public originating IP address can be provided to a comparison component 314, which can compare such location with location stored within a data store 316. More particularly, the data store 316 can include subscriber rights 318 that describe MAC addresses a user can employ in connection with DMS as well as locations where the user is authorized to employ DMS. If the comparison component 314 determines that the location discerned by the lookup component 308 corresponds to an authorized location with respect to the user (retained within the data store 316), then the multi-mode client 304 can be provided access to DMS. If the comparison component 314 determines that the location ascertained by the lookup component does not correspond to an authorized location within the data store 316, then access to DMS can be denied.

The system 300 can additionally include a billing component 320 that can properly bill a subscriber as they switch between solely utilizing a GSM network, for instance, and having calls routed through a packet-switched network. For example, call time associated with a GSM network can be at a first billing rate while call time associated with a packet-switched network may be at a second billing rate. The system 300 can also include a service update component 322 that enables the data store 316 to be updated (e.g., an additional authorized location can be added) if the multi-mode client 304 is not authorized access to DMS based upon their current location. For example, the service update component 322 can generate a graphical user interface and provide it to the multi-mode client 304, such that the user can be provided access to DMS (for a fee) with respect to current location. Moreover, the service update component 322 can implement time restrictions with respect to accessing DMS at the multi-mode client's current location. In a particular example, the service update component 322 can generate a graphical user interface and provide it to the multi-mode client 304, giving a subscriber an option to purchase use of the access point 302 for a threshold amount of time. In another example, a subscriber may have purchased a service package that enables such subscriber to access DMS at three different locations (e.g., at home, at work, and at a coffee house), but the subscriber has yet to specify all three locations. The billing component 320 can then bill the subscriber accordingly.

Figure 4:
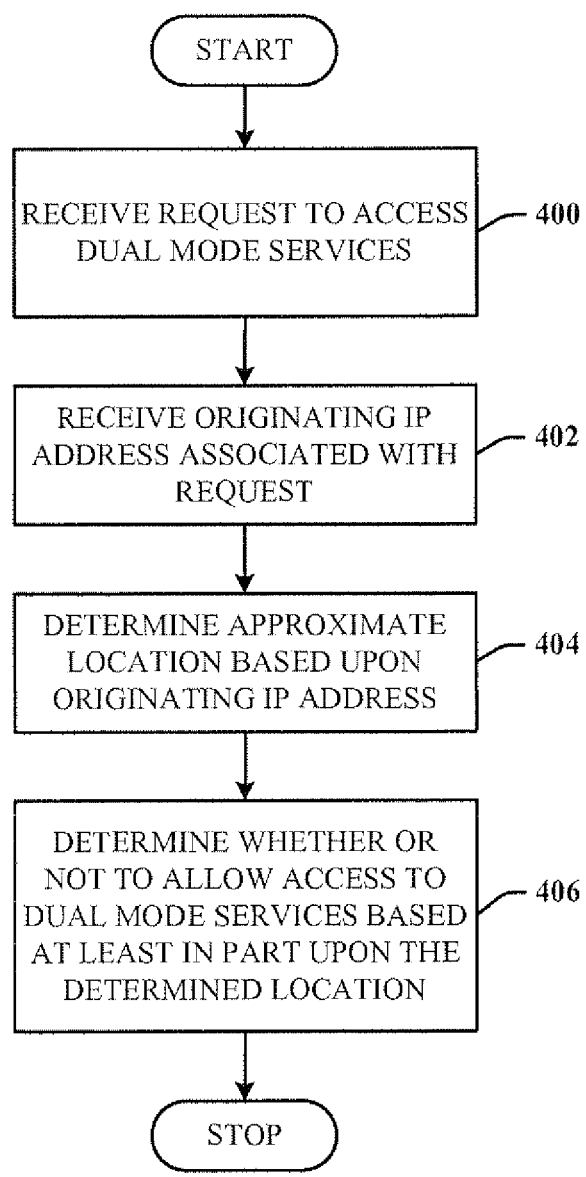
FIG. 4 illustrates a methodology for determining whether or not to allow access to dual mode services with respect to a multi-mode client.
Figure 5:
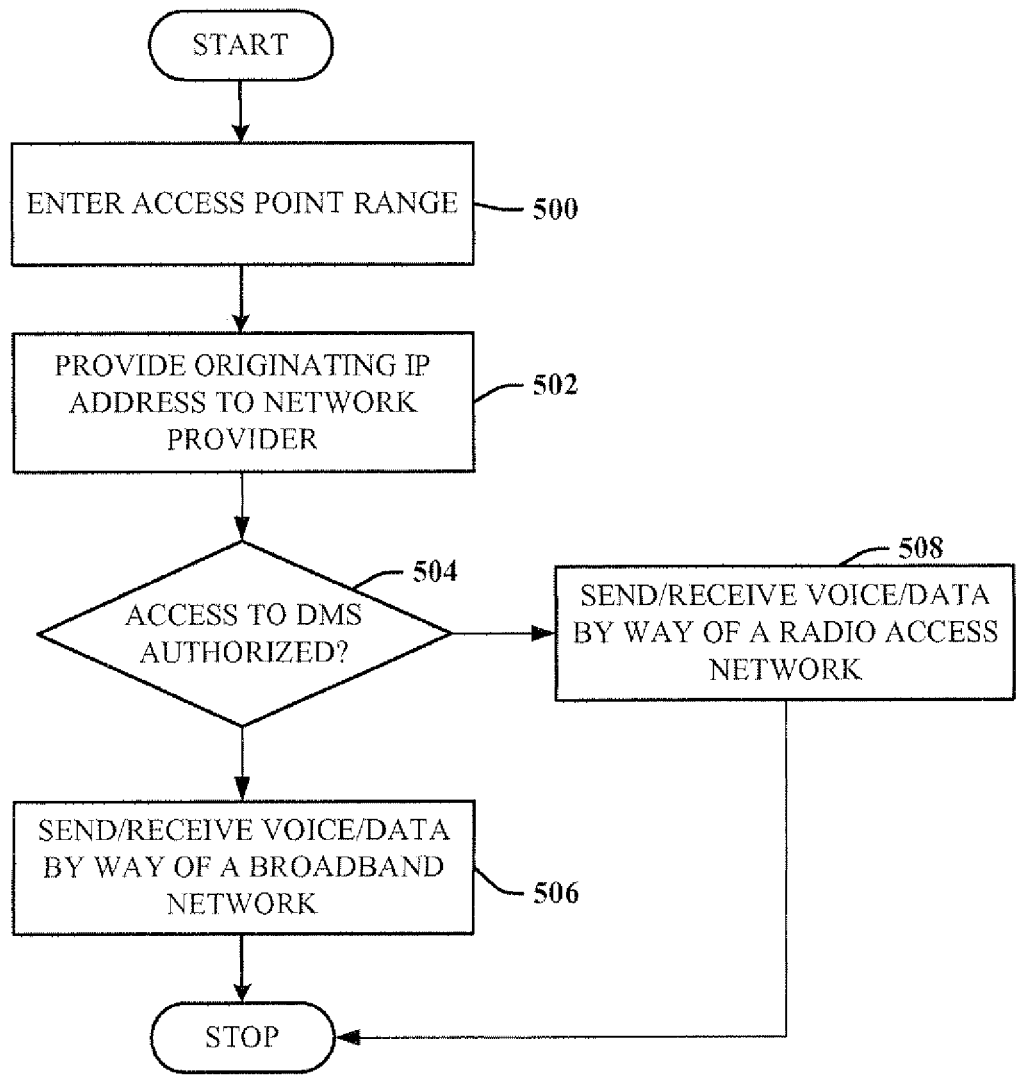
FIG. 5 illustrates a methodology for determining how to send/receive voice data when dual mode services are requested.

Turning to FIGS. 4 and 5, methodologies relating to restricting use of DMS based upon current location of a dual mode client are illustrated. While, for purposes of simplicity of explanation, the methodologies shown herein, e.g., in the form of a flow chart or flow diagram, are shown and described as a series of acts, it is to be understood and appreciated that the claimed subject matter is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Referring specifically to FIG. 4, a methodology for controlling access to DMS is illustrated. At 400, a request to access DMS is received from a dual mode client (e.g., a portable telephone). For example, the dual mode client may come within range of an access point, and can detect WiFi signals output by such access point. Additionally or alternatively, the access point can output Bluetooth signals or any other suitable wireless signals that facilitate connection of the dual mode client with a broadband network. During the request, the dual mode client can generate an IP data packet that can include a public originating IP address (an IP address associated with an IP service provider), data that identifies the dual mode client (or a subscriber associated therewith), and a MAC address of the access point.

At 402, the IP data packet generally, and the public originating IP address in particular, can be received at a component that is maintained by a wireless network provider (e.g., a GSM network provider). At 404, the approximate location of the dual mode device is determined based upon the public originating IP address. For instance, a service that locates a geographic address (e.g., 15 State Avenue, New York, N.Y.) of the IP service provider by analyzing the public originating IP address can be employed to determine the approximate location of the dual mode client. It is understood, however, that any suitable service that can at least approximately locate the dual mode client is contemplated by the inventor and is intended to fall under the scope of the hereto-appended claims.

At 406, a determination is made regarding whether or not to allow access to dual mode services based at least in part upon the determined location. More particularly, a wireless service provider can include a database that retains rights associated with various subscribers. For instance, it may be desirable to restrict a subscriber to an access point within a certain location (rather than allow the subscriber to use any available access points). Thus, the database can include restrictions relating to MAC address of an access point and approximate geographic location of such access point (as ascertained by a geographic location of the IP service provider). Thus, if the MAC address and the location associated with the public originating IP address within the request correspond to a MAC address and location within the database (defining the subscriber's rights), the request for dual DMS will be granted. If the MAC address and the location associated with the originating address within the request do not correspond to the MAC address and location within the database, the request for DMS will be denied and the subscriber will be forced to utilize a radio access network (e.g., a GSM network) and incur fees associated therewith.

Now turning to FIG. 5, a methodology for requesting DMS is illustrated. At 500, a dual mode client enters range of an access point. For instance, the dual mode client can recognize and interpret WiFi signals output by an access point, such as a wireless router or a repeater. At 502, the dual mode client accesses a broadband network associated with the access point and a public originating IP address relating to the access point/dual mode client is provided to a component maintained by a wireless network provided. At 504, a determination is made regarding whether access to DMS is authorized. As described above, such determination is based at least in part upon a geographic location associated with the provided public originating IP address. If it is determined that access to DMS is authorized, then the dual mode client can send/receive voice/data by way of a broadband network associated with the access point (typically at a reduced rate or free) at 506. If it is determined that access to DMS is not authorized, then at 508 voice/data can be sent or received by way of a radio access network, such as a GSM network. Utilization of a radio access network is typically associated with greater fees when compared to use of a broadband network (e.g., VoIP) to send and receive data.

Figure 6:
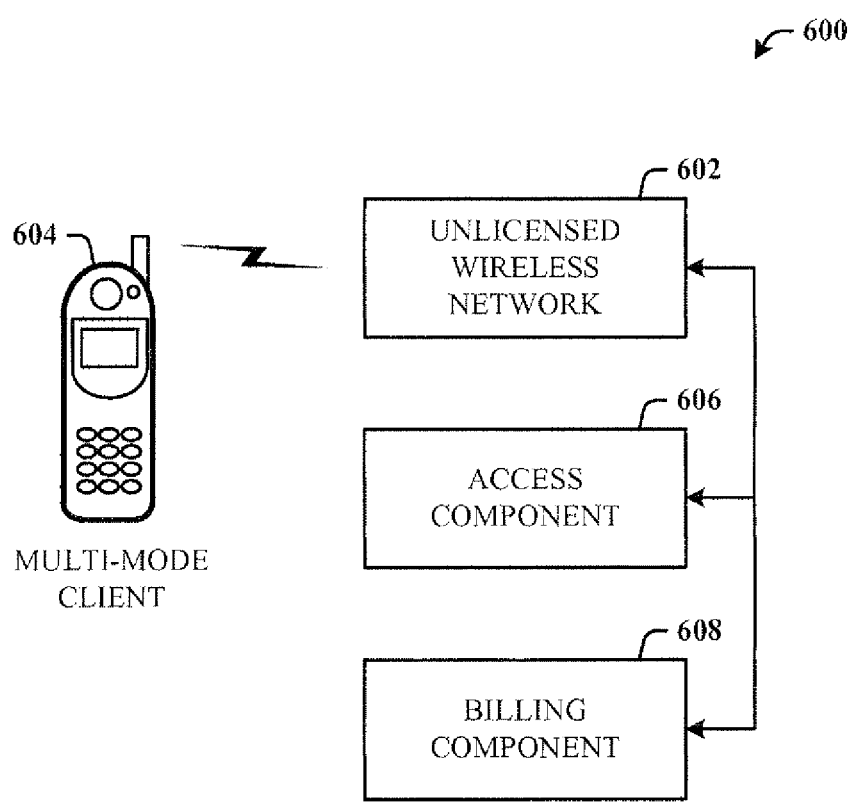
FIG. 6 illustrates a system that facilitates control of network access.

Now referring to FIG. 6, a system 600 that facilitates control of network access is illustrated. As described above, the claimed subject matter facilitates validation and authentication of the physical location of a multi-mode (e.g., DMS) UMA system, thereby restricting the handset from gaining access from unauthorized locations. Thus, access to dual-mode UMA services, for example, at a particular location (e.g., in a subscriber's home, or in a hot spot that is controlled by a carrier) can now be managed to allow or deny service at that location.

Accordingly, the system 600 includes an unlicensed wireless network (UWN) 602 that facilitates communications for a multi-mode UMA client 604 to a radio network. An access component 606 of the radio network is provided that controls access to the radio network by the UMA client 604 based on a physical location of the UMA client 604. In one implementation, the UMA client 604 is a dual-mode mobile handset. The UWN 602 can be a broadband IP network such as a digital subscriber line (DSL) technology, a cable television network, T1/E1, broadband wireless, FTTH (Fiber to the Home), .... The radio network can be a GSM (global system for mobile telecommunications) network and/or a GPRS (general packet radio services) network.

The UWN 602 typically includes a modem (e.g., DSL and/or cable modem) that includes a unique identifier (e.g., a MAC address). Moreover, the modem is assigned a unique IP address by the provider, which IP address is then assigned to the subscriber account information such that the location of the modem can be determined. Thus, with respect to validation, when the UMA client 604 is utilized using existing GSM protocols and procedures, the validation request is encapsulated in IP and routed through the broadband connection gaining access to the GSM network to provide the same data and voice services that are provided on the GSM network while in the unlicensed WiFi network, using the broadband connection (e.g., DSL) as the GSM transport. A server on the radio network provides the mapping from the modem MAC address to the handset to the subscriber home location (where the physical location is the subscriber's home).

Now that the physical location of the client 604 can be known, the system 600 can further comprise a billing component 608 that facilitates billing based on the physical location of the client 604. For example, if the subscriber is at home, the call via a handset that employs the client can be structured by the provider to be free. However, if the subscriber is making a call via the UMA client handset at a remote location (e.g., a retail establishment), it is now possible to charge for that connection at a different fee. Furthermore, now that the physical location of the UMA client handset can be determined, this furthers the mandates of E911 compliance.

Figure 7:
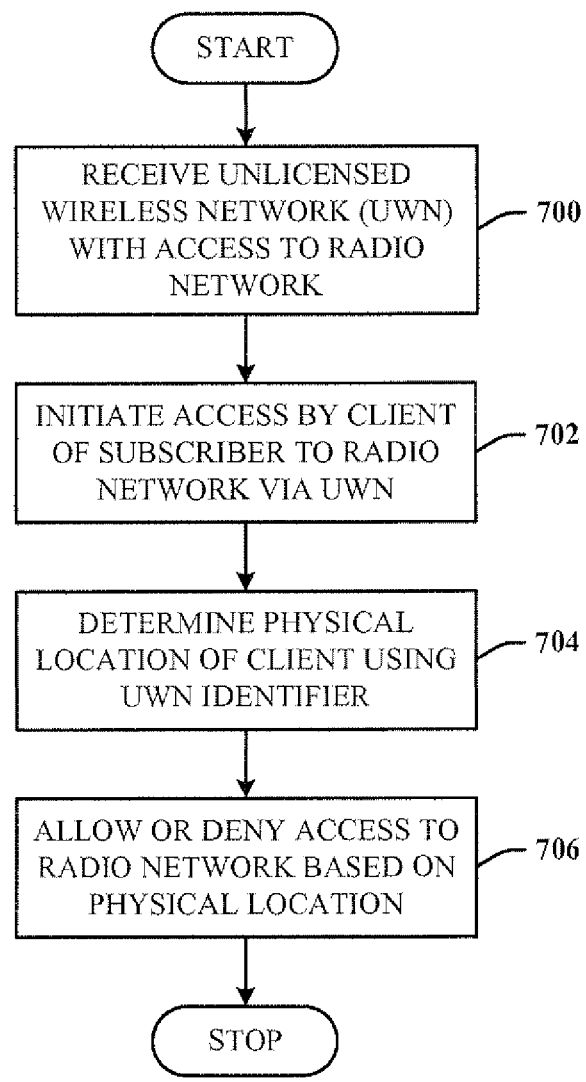
FIG. 7 illustrates a methodology of controlling network access in accordance with the subject innovation.

FIG. 7 illustrates a methodology of controlling network access in accordance with the subject innovation. At 700, a UWN that supports IP packets is received that provides access to a radio network. At 702, a client (e.g., UMA) of a subscriber initiates access to the radio network via the UWN. At 704, the physical location of the client is determined using a UWN identifier. At 706, access to the radio network is either allowed or denied based on the physical location of the client.

Figure 8:
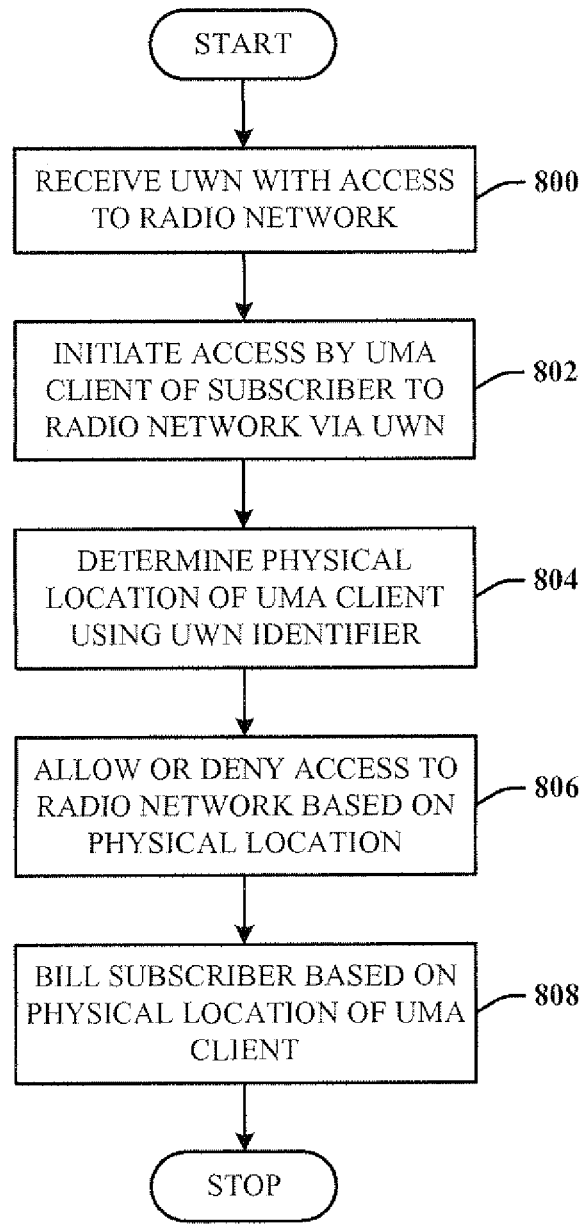
FIG. 8 illustrates a methodology of providing location-based billing in accordance with another aspect.

Referring now to FIG. 8, there is illustrated a methodology of providing location-based billing for a UMA client in accordance with another aspect. At 800, a UWN that supports IP packets is received that provides access to a radio network. At 802, a UMA client of a subscriber initiates access to the radio network via the UWN. At 804, the physical location of the UMA client is determined using a UWN identifier. At 806, access to the radio network is either allowed or denied based on the physical location of the UMA client.

Figure 9:
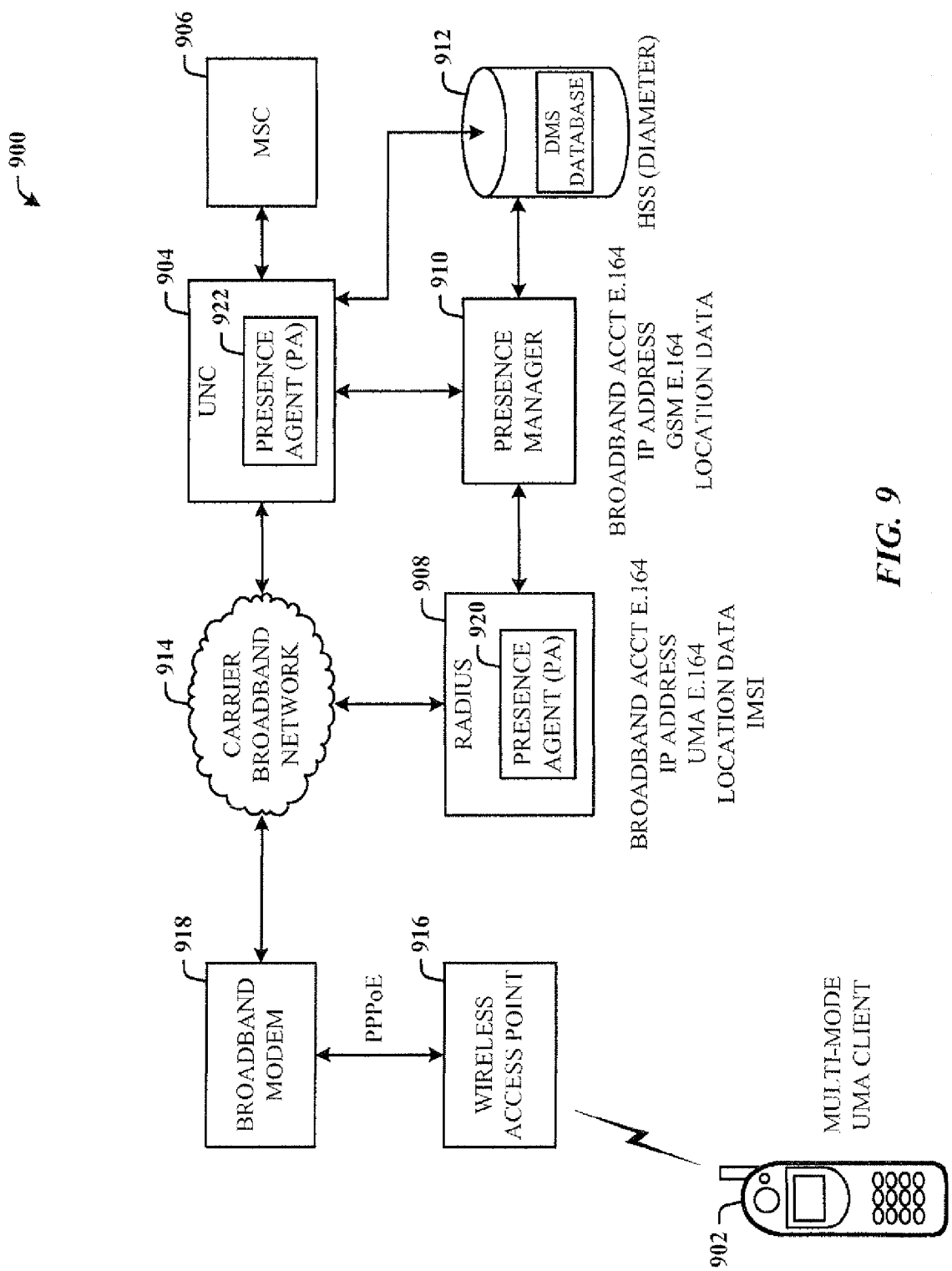
FIG. 9 illustrates a more detailed system that provides network access control of a UMA client in accordance with another aspect of the innovation.

FIG. 9 illustrates a more detailed system 900 that provides network access control of a UMA client 902. In the UMA architecture, at least the following elements exist: the UMA client in the handset 902, a UNC 904 that provides the interface to the core network via 3GPP specified A/Gb interfaces, an MSC (mobile switching center) 906, a RADIUS server 908, a presence manager (PM) 910 and a HSS (home subscriber server) 912. Conventionally, the UMA handset 902 communicates over an unlicensed wireless network (e.g., WiFi, Bluetooth, ... ) to an IP access network 914 (e.g., broadband DSL) to the UNC 904 to be authenticated and authorized for access to core network GSM voice and/or GPRS data services. If approved, the subscriber's current location information stored in the core network is updated, and all mobile voice and data traffic is routed to the UMA handset 902 over the UMA network (UMAN), instead of the radio access network.

In one implementation, the claimed subject matter related to addition of novel functionality to the RADIUS server 908 in the form of a RADIUS presence agent 920 and/or to the UNC 904 in the form of a UNC presence agent 922 via a new database. The presence agents (920 and 922) facilitate communication of presence notification messages. The new database can be located anywhere, for example, in the HSS 912. The HSS 912 then functions at least like a new RADIUS server.

The DMS presence notification message can include a DSL account E.164 number, an IP address, a UMA E.164 number, IMSI (international mobile subscriber identity), and/or subscriber physical location information (e.g., street address, and the like). The IMSI is an ITU-T specification that uniquely identifies a subscriber to a mobile telephone service. The IMSI is used in a GSM network, and can be used in all cellular networks to identify at least the phone's home country and carrier. Once the presence and location information associated with this IP address is received, when the UMA client 902 registers on the UNC 908, the UNC will read the IMSI and the public originating IP address. During the UMA registration procedure, the UMA client sends the following information to the UNC: the IMSI, the AP ID, and the public originating IP address. The system can now go to the HSS 914 and do a search on the IP E.164 address and check to see if it is a valid IP address for this UMA client 902. If yes, then the system will validate the number and grant service. If the DMS is queried and a valid record is not returned, then the address originated from the IP address was one which was not authorized. The DSL carriers can assign specific discreet location information that corresponds to an IP address.

As described supra, a service-provider perspective is provided for controlling where a subscriber can use WiFi to access DMS. The service-provider perspective builds upon existing UMA and broadband security procedures to enable the UNC-SGW to validate the public originating IP address of the UMA client. Solutions include the use of the physical location of the broadband endpoint to control DMS access, provide dynamic location based billing, and dynamically comply with E911 regulations. Although the subject description focuses on the DSL broadband network, the same concept can be applied to non-DSL networks such as cable modem networks, T1/E1, FTTH, etc.

Carriers can now charge differently for converged services depending on where the subscriber is located. For example, if the subscriber uses the parent's DSL service in the home, the call is free. If the subscriber uses a WiFi hotspot at local retail store, the call can be charged at the normal GSM rates, or differently than in the subscriber's home.

Figure 10:
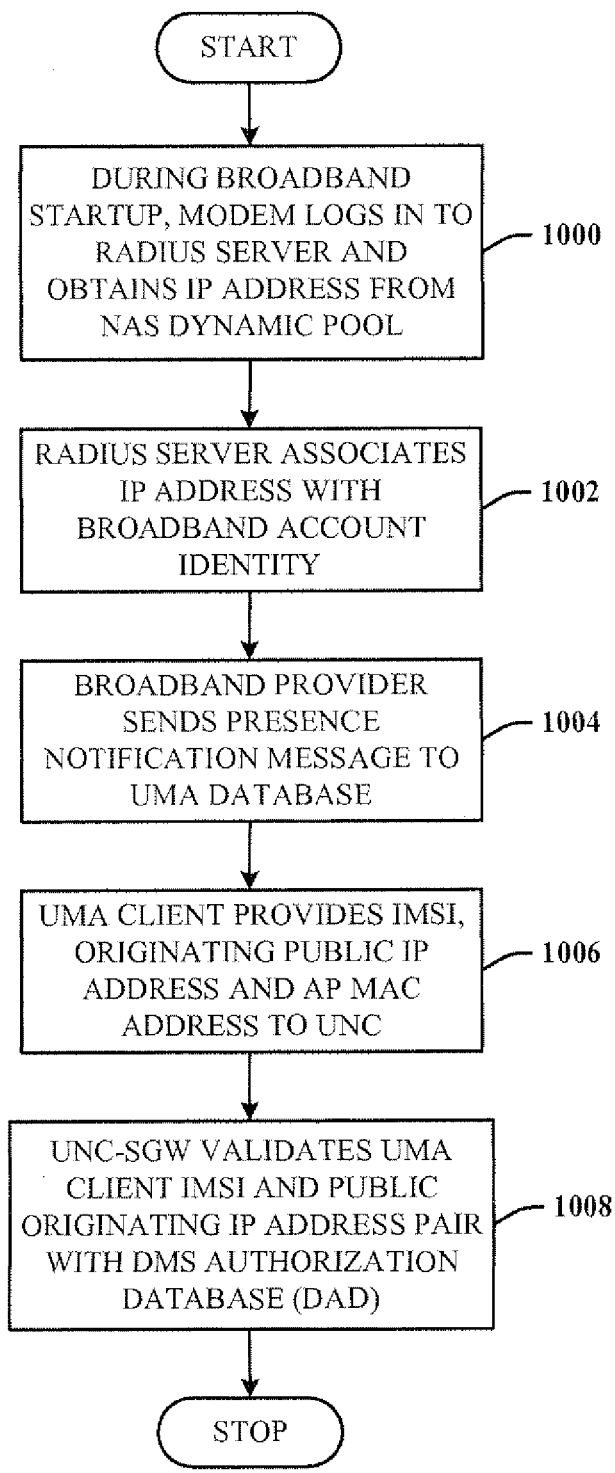
FIG. 10 illustrates a methodology of authenticating by validating a physical endpoint of the subscriber broadband connection and associating the subscriber to an IP address.

FIG. 10 illustrates a methodology of authenticating by validating a physical endpoint of the subscriber broadband connection and associating the subscriber to an IP address. At 1000, during the broadband startup procedure (e.g., the PPPoE initiation procedure), the broadband modem will login to a RADIUS server and obtain an IP address from the Network Access Server's dynamic address pool. For example, as part of the access procedure the RADIUS server will associate the assigned IP address with the broadband account identity (e.g., the POTS (plain old telephone system) E.164 number). At 1002, after associating the IP address with the broadband account identity, the broadband service provider sends a presence notification message to a new DMS subscriber authorization database (DAD), as indicated at 1004. The presence notification message can include information used by the UNC-SGW to authorize the UMA client to use the broadband connection based on the broadband account identity and IMSI parameter. At 1006, during the registration procedure, the UMA client provides the IMSI, originating public IP address, and the MAC address of the access point. At 1008, the UNC-SGW validates the UMA client's IMSI and public originating IP address pair with the DAD.

The DAD is a virtual element that can reside in the UMAN, and can be part of a larger subscriber database such as the HLR (Home Location Register), HSS (Home Subscriber Server), AAA server, or carrier-specific database. Key functions of the DAD include receiving presence notification messages from broadband service providers, correlating the broadband account identity and public IP address with the UMA subscriber's IMSI and with the current IMSI and IP address, and accepting or rejecting authorization requests from the UNC-SGW based on the UMA client IMSI and originating public IP address.

The DAD can be provisioned with an appropriate information record for each authorized broadband identity. FIGS. 11 and 12 illustrate examples of record formats 1100 and 1200 that can be employed. A first record format 1100 can include the following information.

| Field Name | Description |
| --- | --- |
| IMSI | International Mobile Subscriber Identity |
| IP Address | Public originating IP address of the subscriber's broadband CPE (customer premise equipment) |
| Broadband Identity | The account number to identify the subscription owner, can be the same as the POTS E.164 number. |
| Location | Optional field with physical location information of the broadband endpoint. May be the street address or geo coordinates used for E911 location information. |

A second record format 1200 (FIG. 12) can include the following information. Thus, the database record can include the IMSI and the E.164 number.

| Field Name | Description |
| --- | --- |
| IMSI | International Mobile Subscriber Identity |
| IP Address | Public originating IP address of the subscriber's broadband CPE (customer premise equipment) |
| Broadband Identity | The account number to identify the subscription owner, can be the same as the POTS E.164 number. |
| Location Billing Code | Optional field used by the UNC to determine the appropriate CGI (cell global identity) value to be used in the CDR (call detail record). |
| Location Address | Optional field with physical address information of the broadband endpoint. |
| Location Geo Coordinates | Optional field with lat/long of the endpoint used for E911 compliance. |

The broadband service provider's security and access control procedures can be provisioned with one or more IMSIs authorized to use the broadband connection.

The UNC registration procedure can include the following MS (mobile station) and AP (access point) addressing parameters (as provided by the UMA specification UMA Stage 2):

The IMSI associated with the SIM in the terminal. This identifier is provided by the MS to the UNC when it registers to a UNC. The UNC maintains a record for each registered MS. For example, the IMSI is used by the UNC to find the appropriate MS record when the UNC receives a BSSMAP (base station system management application part) PAGING message. The BSSMAP protocol is also used to convey general BSS (base station system) control information between an MSC (mobile switching center) and the BSS. An example is the allocation of traffic channels between the MSC and the BSS.

Public IP address of the MS. The public IP address of the MS is the source IP present in the outermost IP header of packets received from the MS by the UNC-SGW. If available, this identifier may be used by the UNC to support locations services and fraud detection. It may also be used by service providers to signal managed IP networks IP flows that require QoS (quality of service) treatment.

The Access Point (AP) ID. The AP-ID is the MAC address of the unlicensed mode access point through which the MS is accessing UMA service. This identifier is provided by the MS (obtained via broadcast from the AP) to the UNC via the Up interface, when it requests UMA service. The AP-ID may be used by the UNC to support location services. The AP-ID may also be used by the service provider to restrict UMA service access via only authorized APs.

Figure 13:
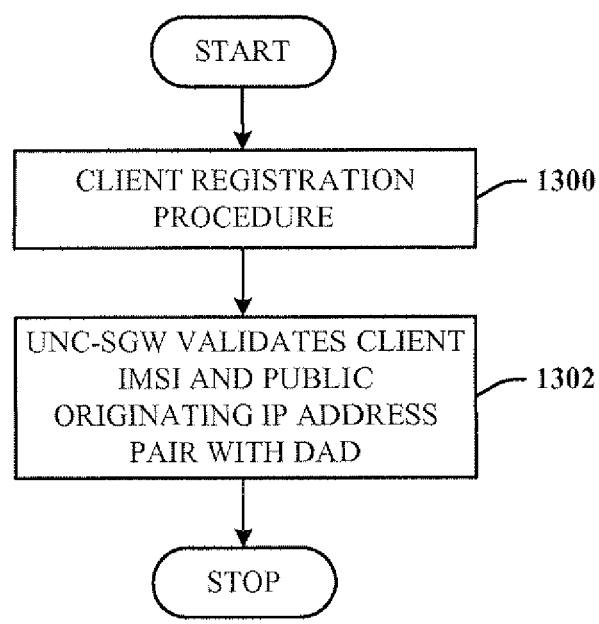
FIG. 13 illustrates a client registration procedure.

FIG. 13 illustrates a client registration procedure. At 1300, a client registration procedure is initiated. At 1302, the UNC-SGW validates the client IMSI and originating public IP address against the DAD.

Figure 14:
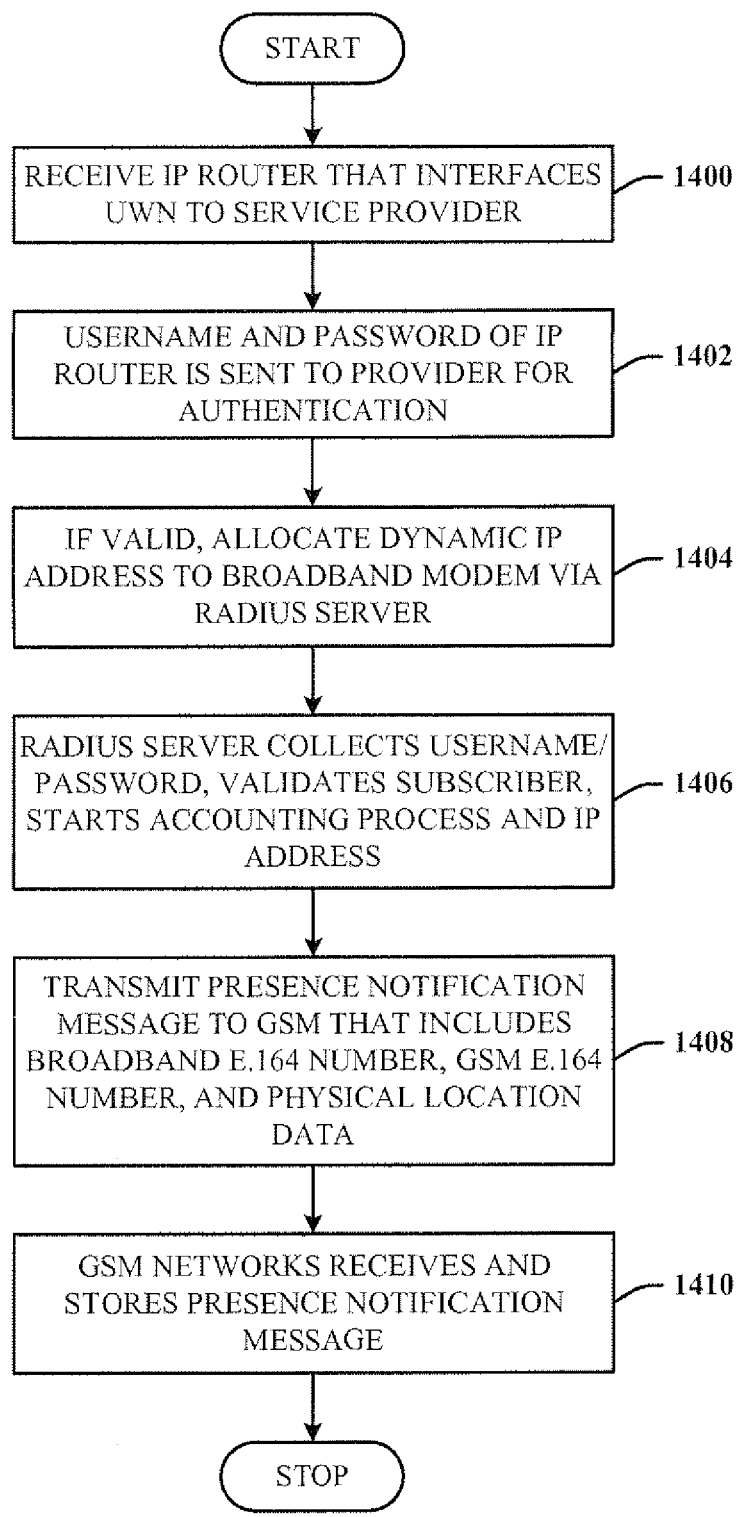
FIG. 14 illustrates a methodology of identifying and validating a physical location of a broadband customer endpoint that is authorized to allow UMA service.

FIG. 14 illustrates a methodology of identifying and validating a physical location of a broadband customer endpoint that is authorized to allow UMA service. At 1400, an IP router is received that interfaces the UWN to the broadband service provider through the broadband modem. On the IP router, the subscriber username and password is entered, which information is sent to the broadband service provider (e.g., DSL provider), for authentication via a RADIUS server, as indicated at 1402. At 1404, the provider then authenticates that username and password as being a valid subscriber, and enables service. At that time, the provider allocates a dynamic IP address (or static IP address) that will be assigned and accepted by the broadband modem. This is handled by the RADIUS server in the broadband network. At 1406, the RADIUS server collects the username/password, validates the subscriber, and starts the accounting process, and knows the IP address of the subscriber and that the particular subscriber has network access.

In accordance with the claimed subject matter, functionality is added to take the information it has collected during the subscriber login and create the presence message that will be transmitted over to the GSM network. Accordingly, at 1408, a presence notification message is sent that includes the broadband E.164 number, a GSM E.164 number, and the physical location data (street address, etc.). At 1410, this data gets sent over to a standard presence interface on the GSM network, which GSM network accepts it, and stores it into a database.

Figure 15:
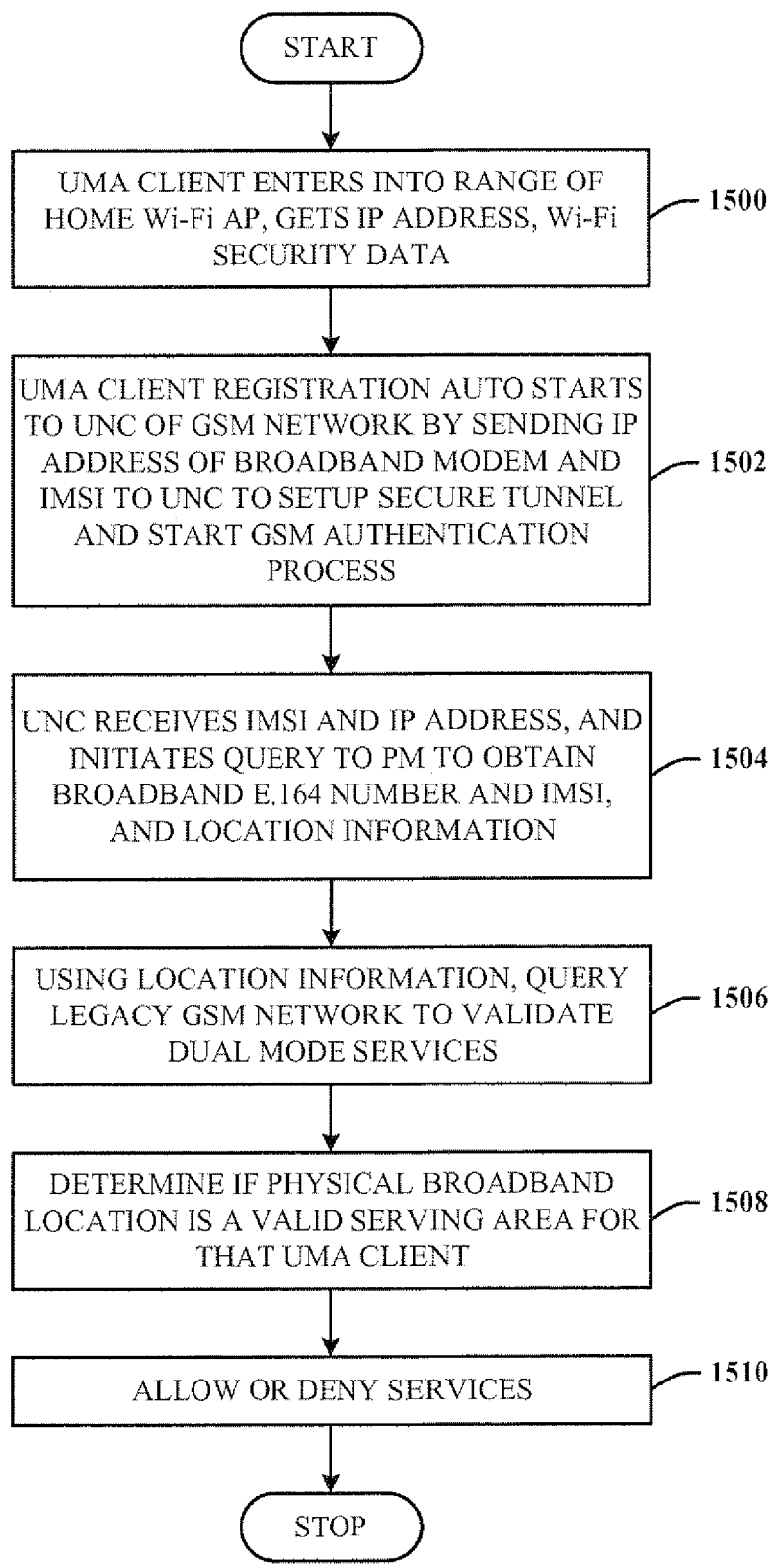
FIG. 15 illustrates a methodology of correlating a broadband physical location with the public originating IP address of the UMA client and subsequently allowing or denying UMA service.

Referring now to FIG. 15, there is illustrated a methodology of correlating a broadband physical location with the public originating IP address of the UMA client and subsequently allow or deny UMA service. At 1500, the UMA client enters into the home, detects the WiFi network and, receives an IP address and WiFi security data. At 1502, a UMA client registration procedure is automatically started back to the UNC on the GSM network. The registration process includes sending the IP address of the broadband modem and the IMSI to the UNC to setup the secure tunnel and start the standard GSM authentication procedures.

In accordance with added novel functionality of the UNC, once the UNC collects the IMSI and IP address, the UNC initiates a query to the database (e.g., the HSS DIAMETER database) to get the E.164 DSL number, and the IMSI, as indicated at 1504. At 1506, using the location information, the UNC collects that information and goes back to the legacy GSM network and queries the network to validate the dual mode services. At 1508, a determination is made whether the broadband physical location is one of the valid serving areas for that particular UMA client. At 1510, in accordance with the determination, service is then allowed or denied.

Figure 16:
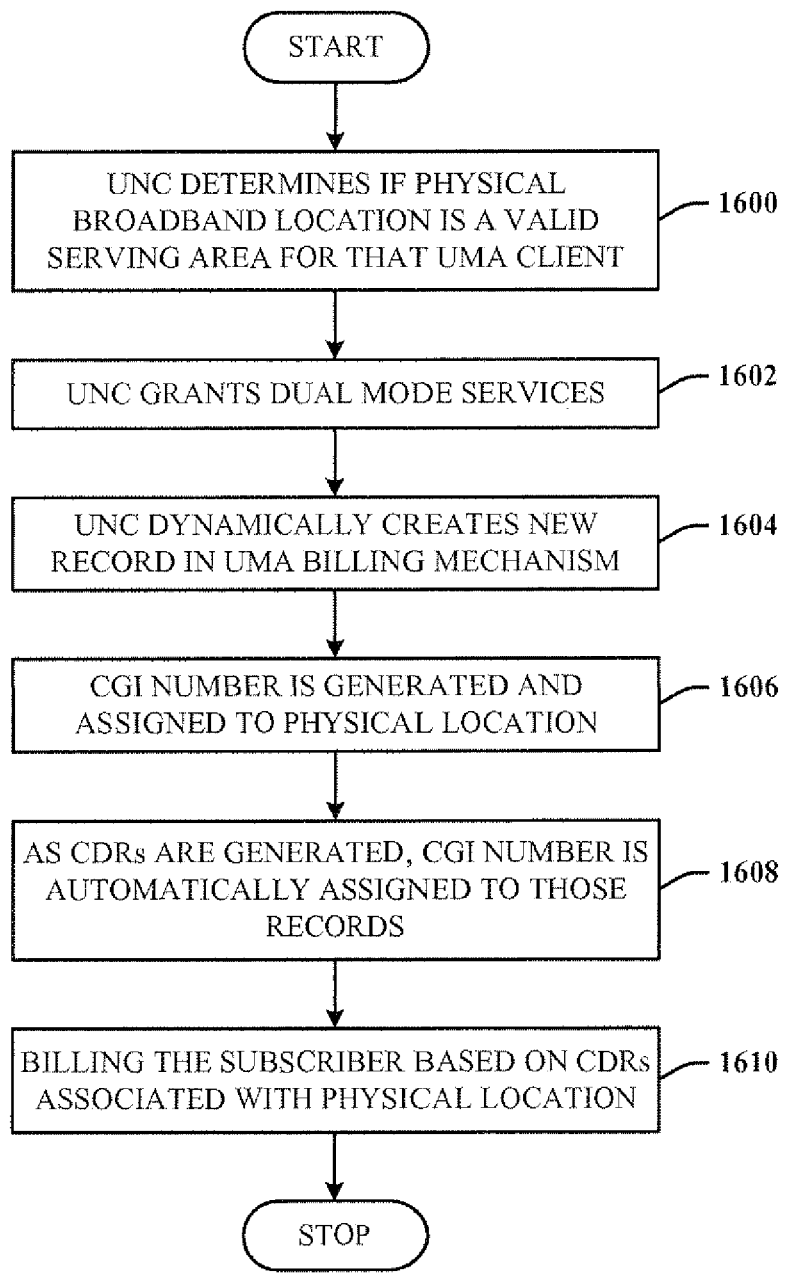
FIG. 16 illustrates a methodology of dynamically assigning a cell global identity to specific IEEE 802.11 access points during the UMA client registration procedure for the purpose of providing location-based billing.

FIG. 16 illustrates a methodology of dynamically assigning a cell global identity to specific IEEE 802.11 access points during the UMA client registration procedure for the purpose of providing location-based billing. The UNC has the capability to generate signaling to the MSC, which will generate a CDR (call detail record), which will have a cell global identity (CGI), and that consists of the location area identity plus cell ID. In accordance to novel functionality added to the UNC, at 1600, the UNC determines if the physical location is a valid serving area for the UMA client. At 1602, when the UNC validates and determines that that particular physical location is valid for that UMA client, it grants dual-mode services. At 1604, the UNC dynamically creates a new record in the UMA billing mechanism. At 1606, a CGI number is generated and assigned for that physical location. At 1608, as the UNC generates CDRs, a dynamically created CGI is applied for those particular call records. Almost all new functionality is provided in UNC via the presence agent. There can also be functionality added to the RADIUS server for the broadband component via a RADIUS presence agent. At 1610, the subscriber can then be billed according to the CDRs that were generated in association with the physical location.

Figure 17:
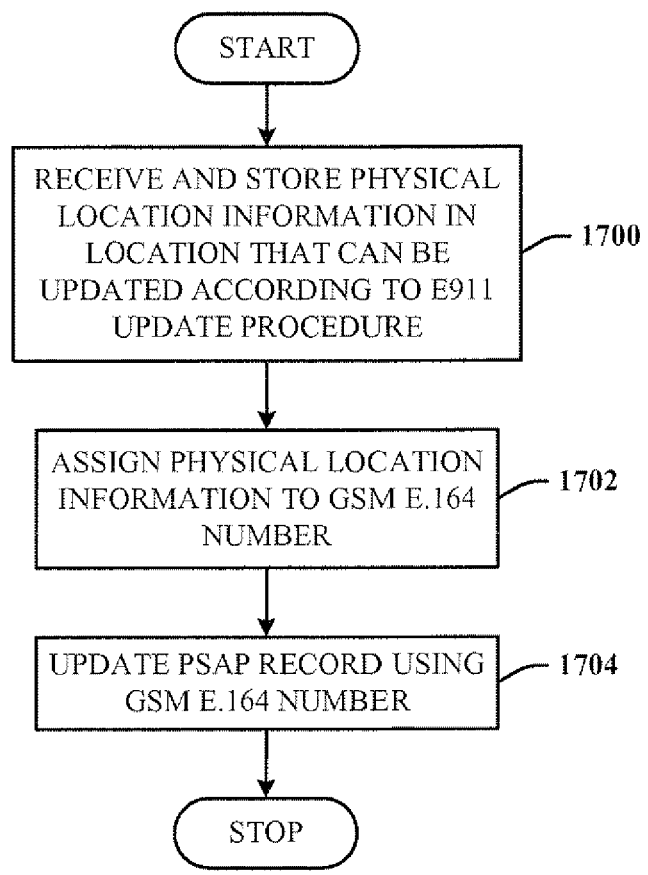
FIG. 17 illustrates a methodology of dynamically assigning physical location information to UMA client sessions for the purpose of E911 compliance.

Referring now to FIG. 17, there is illustrated a methodology of dynamically assigning physical location information to UMA client sessions for the purpose of E911 compliance. At 1700, the physical location information is collected and stored in a database. This database can reside in the UNC, and/or in the HSS where there is a notification sent that triggers an E911 database update procedure or in both the UNC and the HSS, for example. At 1702, the physical location information is then assigned to that particular GSM E.164 number. At 1704, the GSM E.164 number can be used to update a PSAP (public safety answering point) database with physical location data for that E.164 number. The PSAP is the first contact an E911 caller will get. The PSAP operator verifies or obtains the caller's whereabouts (location information), determines the nature of the emergency and decides which emergency response teams to notify.

Figure 18:
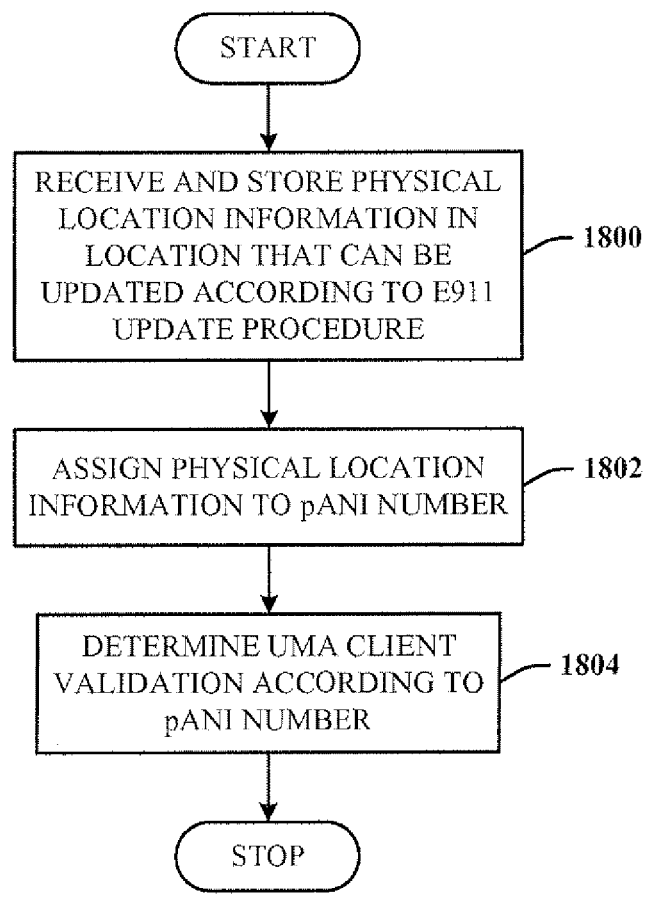
FIG. 18 illustrates an alternative methodology of dynamically assigning physical location information to UMA client sessions for the purpose of E911 compliance.

FIG. 18 illustrates an alternative methodology of dynamically assigning physical location information to UMA client sessions for the purpose of E911 compliance. At 1800, the physical location information is collected and stored in a database. This database can reside in the UNC, and/or in the HSS where there is a notification sent that triggers an E911 database update procedure or in both the UNC and the HSS, for example. Alternatively, at 1802, the physical location can be assigned as a pANI (pseudo automatic number identification) for the base transceiver station (BTS) towers. The pANI is a modification of the ANI, and is used to pass information across systems that can handle ANI traffic. The pANI is a number employed in wireless E911 call setup that can be used to route the call the appropriate PSAP. The pANI generally identifies the cell/sector from which the call was made, whereas the ANI carries the actual telephone number of the wireline caller. Thus, at 1804, an E911 call center can obtain the telephone number and a general location of the caller based on the pANI number. In one implementation, a pseudo telephone number is created and assigned to a BTS tower, a cell sector, and stored in a PSAP database.

Figure 19:
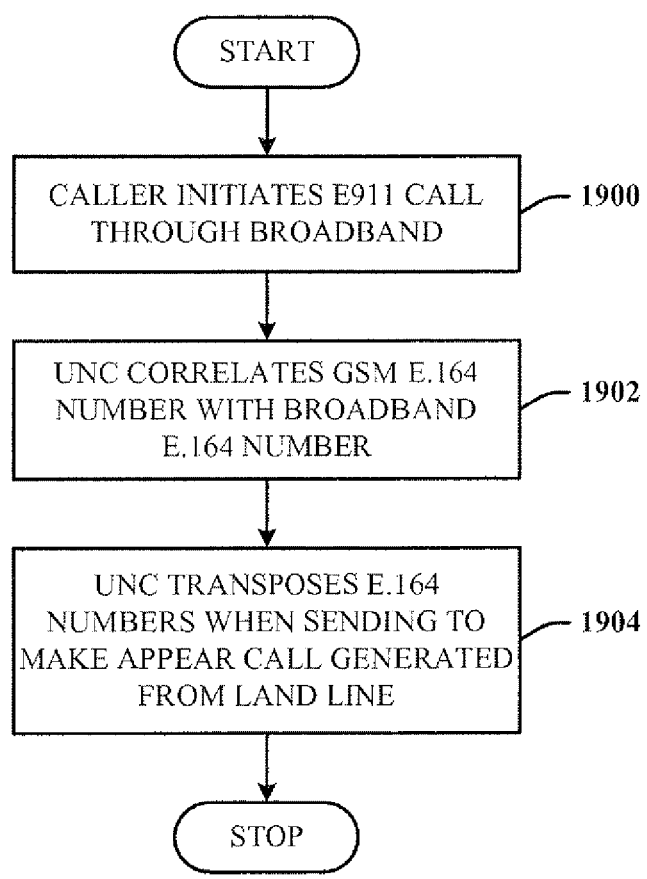
FIG. 19 illustrates yet another alternative methodology of dynamically assigning physical location information to UMA client sessions for the purpose of E911 compliance.

FIG. 19 illustrates yet another alternative methodology of dynamically assigning physical location information to UMA client sessions for the purpose of E911 compliance. At 1900, the caller initiates an E911 call through the broadband network. At 1902, the UNC correlates the GSM E.164 number with the broadband E.164 number (e.g., DSL E.164 number). At 1904, the UNC transposes the E.164 numbers when sending the digits to the selected tandem. That way, the UNC makes it appear as though the call is originating from a land line. The broadband E.164 number will already have that physical street address for that telephone number.

Figure 20:
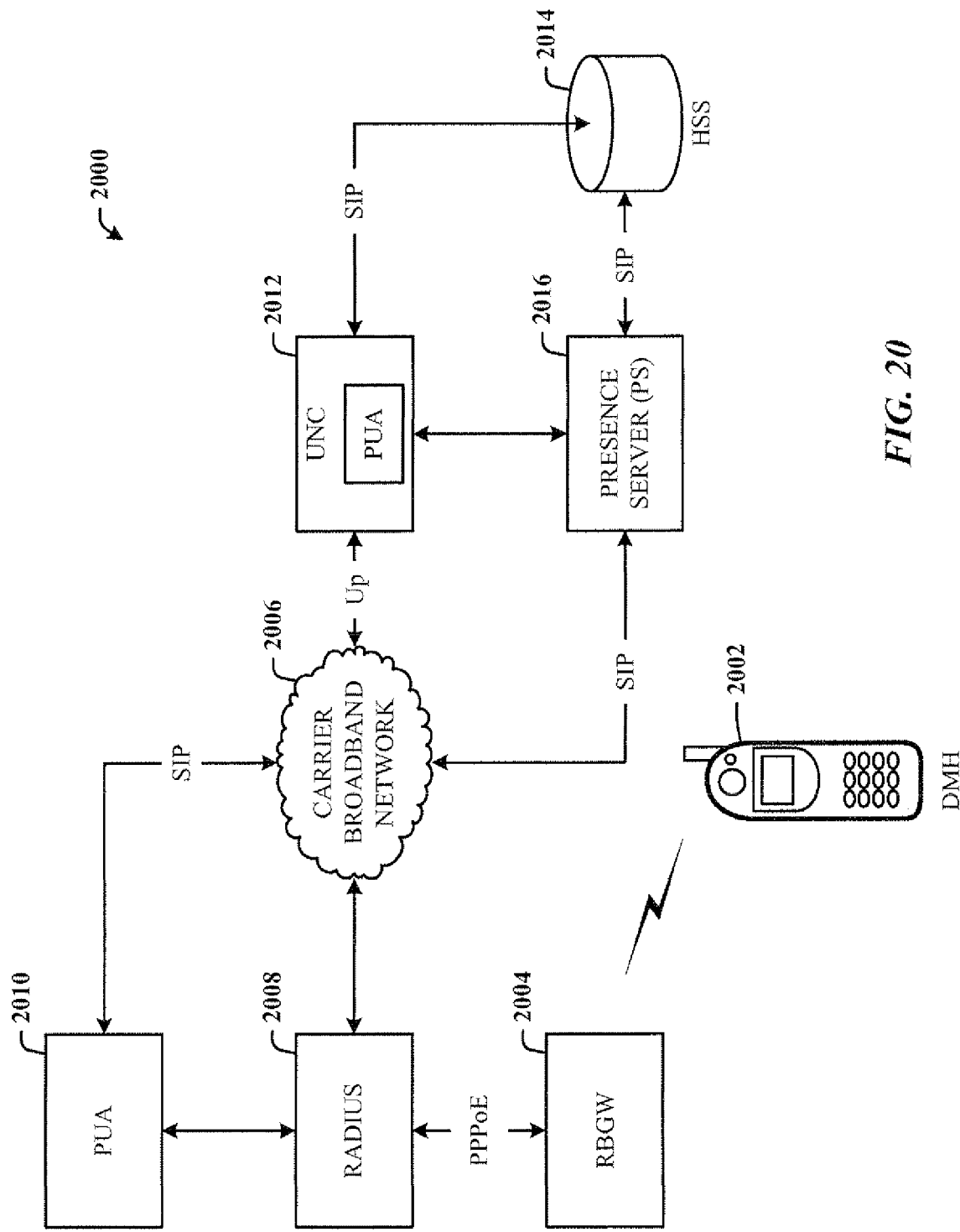
FIG. 20 illustrates another exemplary architecture according to one innovative aspect.

FIG. 20 illustrates another exemplary architecture 2000 according to one innovative aspect. For the purpose of illustrating this Dynamic DMS Access Control concept, a dual mode handset (DMH) 2002 is provided, which can be a UMA handset. However, it is within contemplation that IMS VoIP handsets can also be supported. The innovation has zero impact on the DMH and reuses the IMSI and public originating IP address during the UMA registration procedure.

The wireless handset 2002 communicates with an RBGW 2004. This element 2004 can include any or all of a broadband modem (in this case a DSL modem), an IP router, a WiFi access point, and analog terminal adapters. The RBGW 2004 uses the PPPoE protocol for IP access to a broadband network 2006. The RBGW interfaces to a RADIUS (remote authentication dial-in user service) 2008, which authenticates the RBGW, authorizes service, and assigns an IP address, for example.

A presence user agent (PUA) 2010 interfaces to the RADIUS server 2008 and the broadband network 2006. The PUA 2010 provides functionality to notify the 3GPP network of the physical attributes (e.g., identity, IP address, and location) of the broadband endpoint.

A UNC 2012 interfaces to the broadband network 2006 and includes the SGW that authenticates and authorizes service to the DMH client 2002 (e.g., UMA). A new function (a presence user agent) in the UNC is introduced that queries an HSS 2014 to validate broadband endpoints during the UMA registration procedure. A presence server 2016 is provided that receives presence information from the PUA 2010 and updates the subscriber record in the HSS 2014. The HSS 2014 is part of the IMS core used for subscriber provisioning and stores profiles. A new schema is introduced to support the correlation of broadband identities and IP addresses with IMSI data. This concept assumes the HSS includes the DAD.

Following are two message flows that impact the broadband link activation and UMA client registration procedures. For simplicity, not all messaging procedures are shown and some procedures may be simplified. The RADIUS element is assumed to include the network access server and aggregator functions.

Figure 21:
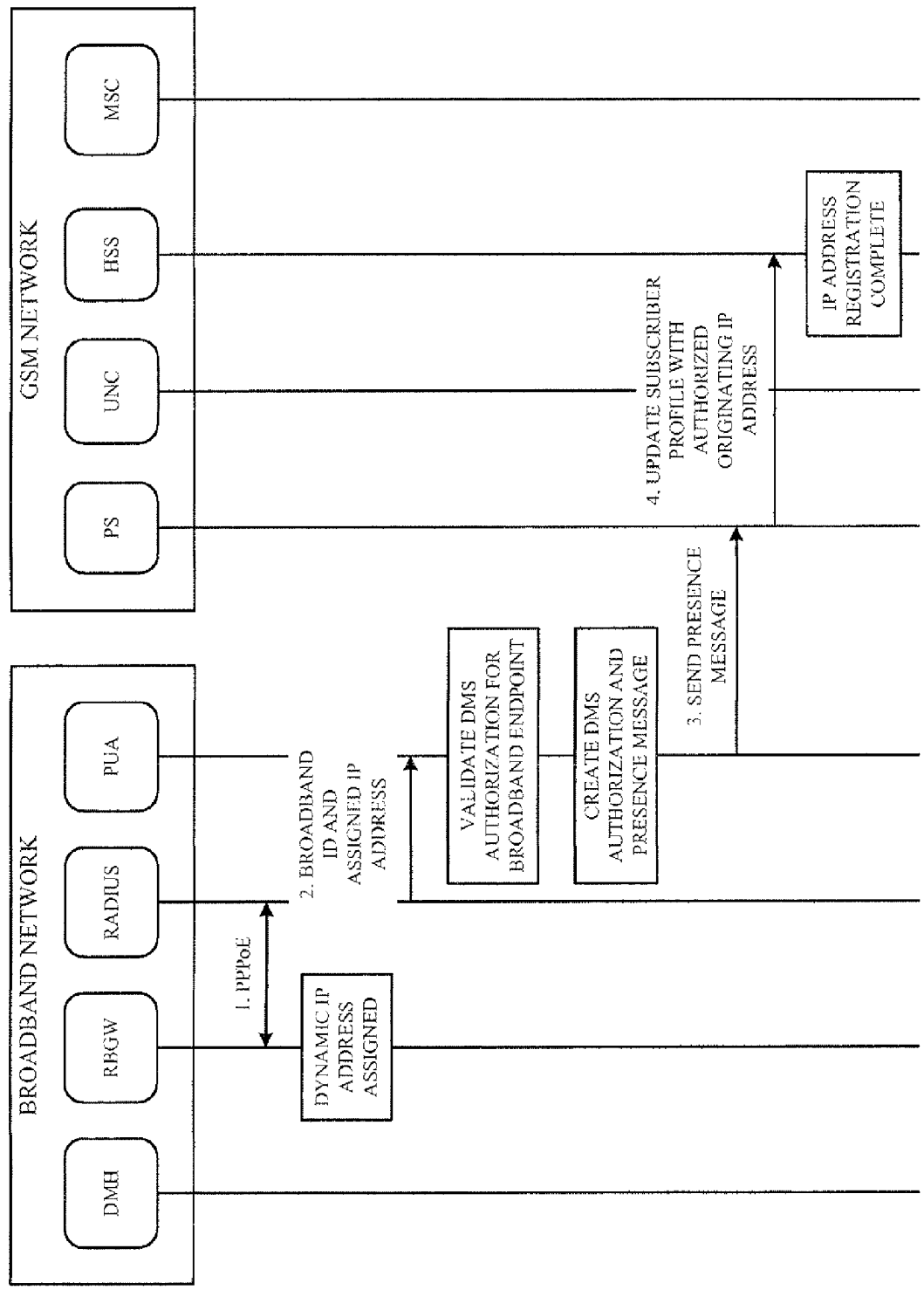
FIG. 21 illustrates a message flow for an IP registration procedure.

FIG. 21 illustrates a message flow for an IP registration procedure. A PPPoE session is started and established between the RBGW and RADIUS node. This process authenticates the RBGW, initiates a PPP session, assigns an IP address, and starts accounting. A result is that an IP address is assigned to the RBGW (e.g., a DSL modem). The RADIUS node then notifies the PUA of the broadband service identity, typically the POTS E.164 number, and the IP address assigned to the RBGW. This notification triggers the PUA to query the broadband subscriber database (not shown) to determine if the broadband identity is allowed to support DMS. If DMS is allowed, the PUA collects the endpoint location information from the broadband subscriber database. A result is that DMS authorization is validated for the broadband endpoint. Another result is that a DMS authorization and presence message is created. The PUA then sends the DMS authorization and presence message to the presence server. This notification triggers the presence server to initiate a subscriber profile update in the DAD, here located in the HSS. The presence server updates the subscriber's record in the DAD, in this case the HSS, with the public originating IP address of the authorized broadband endpoint. The UNC uses this information during the UMA registration procedure. At this point, IP address registration is complete.

Figure 22:
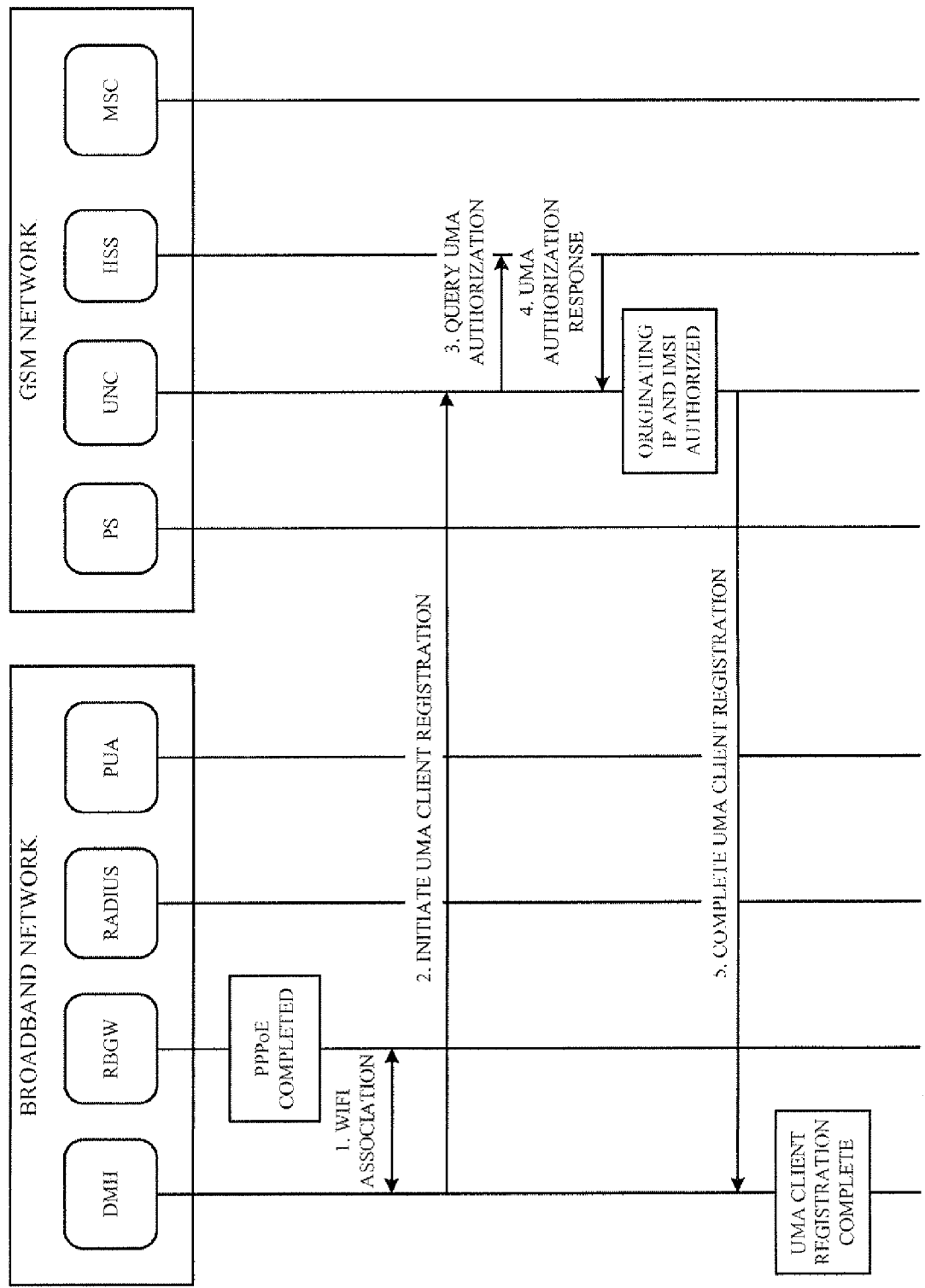
FIG. 22 illustrates message flow for a UMA registration and authorization procedure.

FIG. 22 illustrates message flow for a UMA registration and authorization procedure. Initially, a PPPoE is session is active to the RBGW. The DMH initiates and completes a WiFi association process that includes the IEEE 802.11 security. The DMH initiates the UMA registration procedure with the UNC. The UNC identifies the IMSI and public originating IP address in the registration message and IP packets. The UNC queries the HSS for the IMSI and public originating IP address. If found, the UNC allows DMS access for this broadband endpoint. If not, access is denied. A result is that the public originating IP address and IMSI are authorized. The UMA client and UNC complete the UMA registration process including SIM Authentication (not shown) and an IPsec tunnel. The UMA client registration is then complete.

In a scenario of multiple access points served by a single, public originating IP address, and because the UMA client can include the access point MAC address during the UMA registration procedure, a combination of public originating IP address and access point MAC address can be used to identify UMA caller's E911 location.

With respect to a broadband provider, the subject innovation can envision that a static IP address is required to support E911 for enterprise environments that use a single, public originating IP address to serve multiple WiFi access points in multiple locations. However, dynamic IP addressing can also be used to support the enterprise.

A broadband provider concept envisions a self-provisioning mechanism whereby the subscriber and/or DMS provider can be allowed to update a broadband account profile to set DMS permissions for the broadband endpoint. With regards to provisioning, each broadband account can be provisioned to allow or deny the self-provisioning of DMS-allowed IMSI(s). The broadband subscriber controls which DMS E.164 (or IMSIs) are allowed to use his or her broadband service. Each broadband account can be self-provisioned by the subscriber or other mechanism with one or more IMSIs that are allowed DMS from this endpoint. One method may be for the DMS provider to update the broadband account with a list of authorized IMSIs. The broadband provider can enable a PPPoE access concentrator to trigger the appropriate presence notification to the DAD via the PUA.

With respect to a DMS provider, the innovation can assume that no additional per subscriber provisioning is required. The DAD can use the IMSI as the key field. The DAD can be dynamically provisioned as part of the standard DMS provisioning process. A presence server can be employed to receive notifications from the broadband provider PUA and update the DAD. The DMS authentication and access control element (in this case the UNC-SGW) can query the DAD during the DMS registration procedure to allow or deny DMS based on the DMH IMSI and public originating IP address.

E911 call handling and database procedures require the DMS provider to identify the appropriate PSAP via the E911 tandem or selective router. The DMS provider associates the location of the broadband endpoint with the appropriate PSAP. The DMS provider may update an automatic location information (ALI) database with the current information of the DMS E.164 number. The DMS Provider can enable the DMS E911 call to masquerade as a fixed wireline call by replacing the DMS E.164 number's calling number (ANI) ID with the broadband E.164 number. This procedure puts DMS E911 calls on par with fixed wireline E911 calls. The DMS handset can provide a visual indicator to inform the subscriber of his or her E911 location status (e.g., good, unavailable, other). The DMS provider can provide an E911 location update to the DMS handset and expose this information to the subscriber.

The enterprise is responsible for updating (e.g., mechanized and/or via the broadband provider) the DAD with the current and accurate location information for access points in the enterprise. In a scenario where a static IP and/or address space is assigned to a physical endpoint, a manual process can be used to update the DAD. In a case where multiple access points are served by a single broadband endpoint, a manual process can be implemented to associate an access point MAC address with the physical endpoint location. See the following DAD record example for multiple access points

| Field Name | Value |
| --- | --- |
| AP_MAC_ADDRESS | 00-05-9A-3C-78-00 |
| BROADBAND_ID | 404-555-1212 |
| AP_LOCATION | 5565 Glenridge Connector, 9$^{th}$ floor |

After the UNC queries the DAD and authorizes the public originating IP address, a second query can be made to search for an access point record. If the access point is found and its BROADBAND_ID field matches the broadband record BROADBAND_ID field, the E911 location information is set to the AP_LOCATION value. This technique for supporting multiple access points can require new development to the PSAP and/or ALI.

Figure 23:
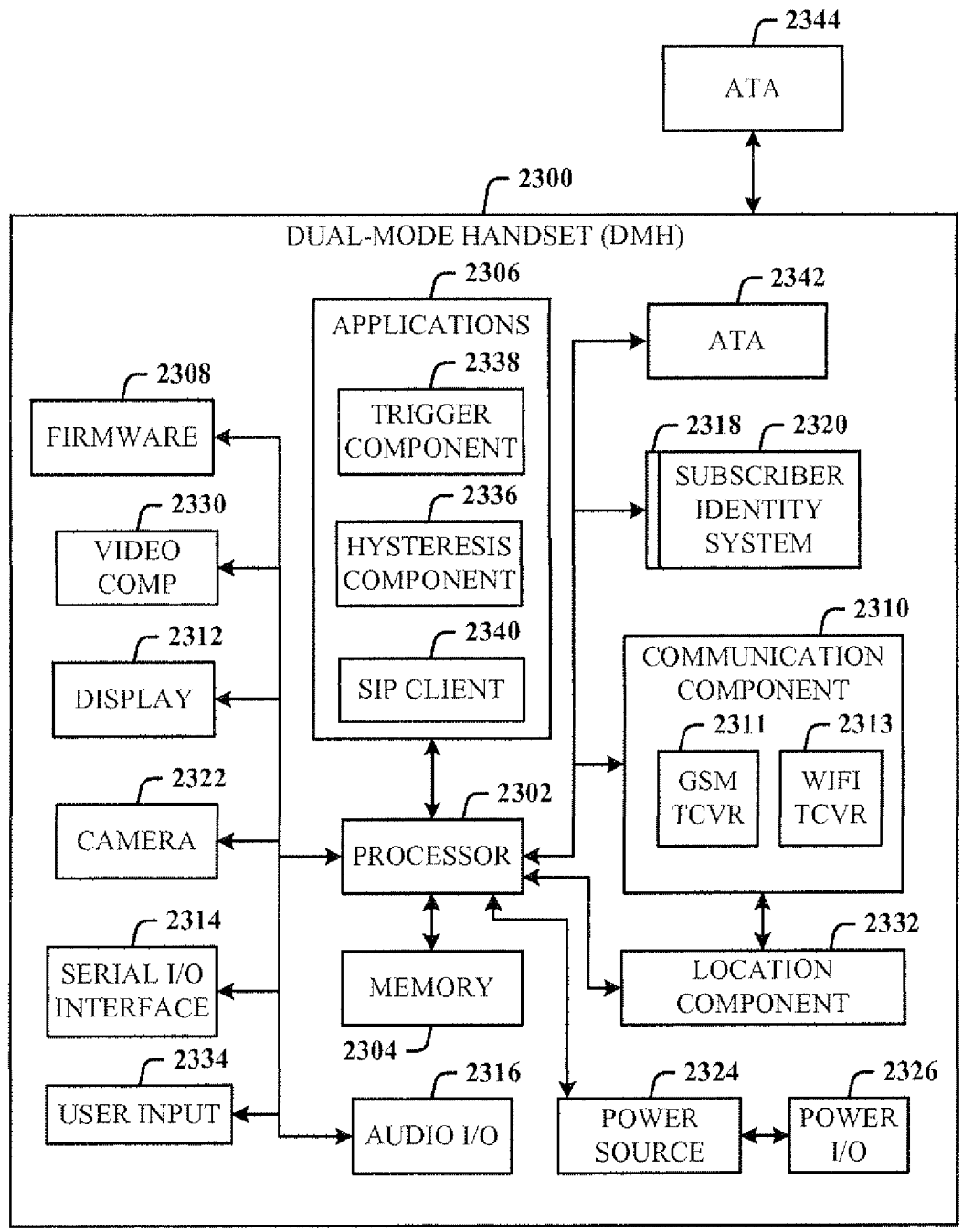
FIG. 23 illustrates a schematic block diagram of a dual-mode handset (DMH) in accordance with an innovative aspect.

FIG. 23 illustrates a schematic block diagram of a dual-mode handset (DMH) 2300. In order to provide additional context for various aspects thereof, FIG. 23 and the following discussion are intended to provide a brief, general description of a suitable environment 2300 in which the various aspects of the claimed subject matter can be implemented. While the description includes a general context of computer-executable instructions, those skilled in the art will recognize that the claimed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The DMH 2300 (similar to client handset 104, 402, 2002) includes a processor 2302 for controlling and processing all onboard operations and functions. A memory 2304 interfaces to the processor 2302 for storage of data and one or more applications 2306 (e.g., a video player software, user feedback component software, etc.). Other applications can include voice recognition of predetermined voice commands that facilitate initiation of the user feedback signal, as well as those described infra. The applications 2306 can be stored in the memory 2304 and/or in a firmware 2308, and executed by the processor 2302 from either or both the memory 2304 or/and the firmware 2308. The firmware 2308 can also store startup code for execution in initializing the DMH 2300. A communication component 2310 interfaces to the processor 2302 to facilitate wired/wireless communication with external systems, e.g., cellular networks, VoIP networks, and so on. Here, the communications component 2310 also includes a GSM transceiver 2311 and a WiFi transceiver 2313 for corresponding signal communications. The DMH 2300 can be a device such as a cellular telephone, a PDA with mobile communications capabilities, and messaging-centric devices.

The DMH 2300 includes a display 2312 for displaying text, images, video, telephony functions (e.g., a Caller ID function), setup functions, and for user input. The display 2312 can also accommodate the presentation of multimedia content. A serial I/O interface 2314 is provided in communication with the processor 2302 to facilitate wired and/or wireless serial communications (e.g., USB, and/or IEEE 1394) via a hardwire connection, and other serial input devices (e.g., a keyboard, keypad, and mouse). This supports updating and troubleshooting the DMH 2300, for example. Audio capabilities are provided with an audio I/O component 2316, which can include a speaker for the output of audio signals related to, for example, indication that the user pressed the proper key or key combination to initiate the user feedback signal. The audio I/O component 2316 also facilitates the input of audio signals via a microphone to record data and/or telephony voice data, and for inputting voice signals for telephone conversations.

The DMH 2300 can include a slot interface 2318 for accommodating a SIC (Subscriber Identity Component) in the form factor of a card Subscriber Identity Module (SIM) or universal SIM 2320, and interfacing the SIM card 2320 with the processor 2302. However, it is to be appreciated that the SIM card 2320 can be manufactured into the DMH 2300, and updated by downloading data and software thereinto.

The DMH 2300 can process IP data traffic via the communication component 2310 to accommodate IP traffic from an IP network such as, for example, the Internet, a corporate intranet, a home network, a person area network, etc., via an ISP or broadband cable provider. Thus, VoIP traffic can be utilized by the DMH 2300 and IP-based multimedia content can be received in either an encoded or decoded format.

A video processing component 2322 (e.g., a camera) can be provided for decoding encoded multimedia content. The DMH 2300 also includes a power source 2324 in the form of batteries and/or an AC power subsystem, which power source 2324 can interface to an external power system or charging equipment (not shown) via a power I/O component 2326.

The DMH 2300 can also include a video component 2330 for processing video content received and, for recording and transmitting video content. A location tracking component 2332 facilitates geographically locating the DMH 2300. As described hereinabove, this can occur when the user initiates the feedback signal automatically or manually. A user input component 2334 facilitates the user initiating the quality feedback signal. The input component can include such conventional input device technologies such as a keypad, keyboard, mouse, stylus pen, and touch screen, for example.

Referring again to the applications 2306, a hysteresis component 2336 facilitates the analysis and processing of hysteresis data, which is utilized to determine when to associate with the access point. A software trigger component 2338 can be provided that facilitates triggering of the hysteresis component 2338 when the WiFi transceiver 2313 detects the beacon of the access point. A SIP client 2340 enables the DMH 2300 to support SIP protocols and register the subscriber with the SIP registrar server.

The DMH 2300, as indicated supra related to the communications component 2310, includes an indoor network radio transceiver 2313 (e.g., WiFi transceiver). This function supports the indoor radio link, such as IEEE 802.11, for the dual-mode GSM handset 2300. The DMH 2300 can also include an internal analog terminal adapter (ATA) 2342 for interfacing to analog devices such as modems and fax machines, for example. Alternatively, or in addition to the internal ATA 2342, an external ATA module 2344 can be provided for the same purposes as the internal ATA module 2342.

Figure 24:
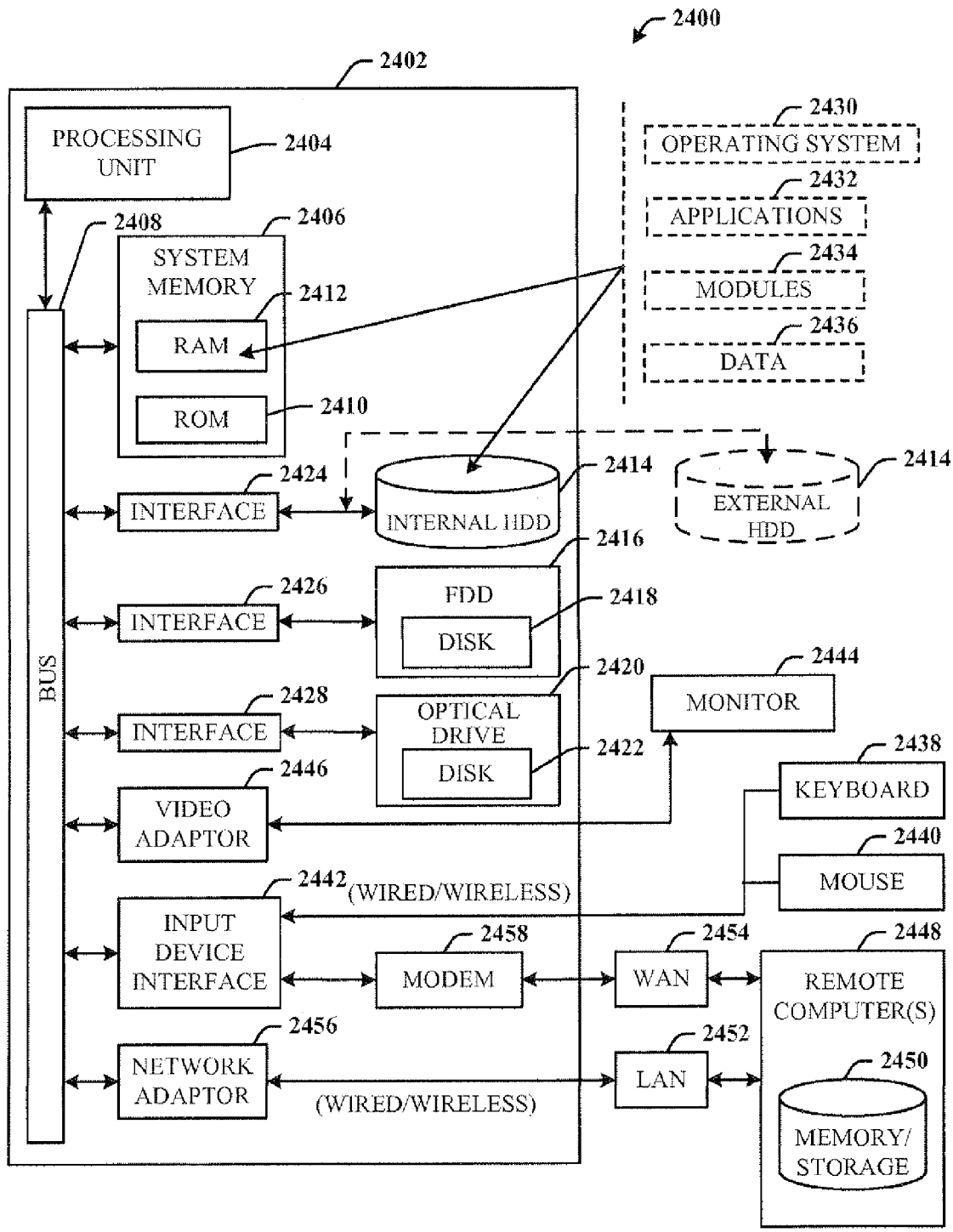
FIG. 24 illustrates a block diagram of a computer operable to provide storage and access such as for the UNC and/or HSS.

Referring now to FIG. 24, there is illustrated a block diagram of a computer operable to provide storage and access such as for the UNC and/or HSS. In order to provide additional context for various aspects thereof, FIG. 24 and the following discussion are intended to provide a brief, general description of a suitable computing environment 2400 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 24, the exemplary environment 2400 for implementing various aspects includes a computer 2402, the computer 2402 including a processing unit 2404, a system memory 2406 and a system bus 2408. The system bus 2408 couples system components including, but not limited to, the system memory 2406 to the processing unit 2404. The processing unit 2404 can be any of various commercially available processors. Dual microprocessors and other multi-processor architectures may also be employed as the processing unit 2404.

The system bus 2408 can be any of several types of bus structure that may further interconnect to a memory bus (with or without a memory controller), a peripheral bus, and a local bus using any of a variety of commercially available bus architectures. The system memory 2406 includes read-only memory (ROM) 2410 and random access memory (RAM) 2412. A basic input/output system (BIOS) is stored in a non-volatile memory 2410 such as ROM, EPROM, EEPROM, which BIOS contains the basic routines that help to transfer information between elements within the computer 2402, such as during start-up. The RAM 2412 can also include a high-speed RAM such as static RAM for caching data.

The computer 2402 further includes an internal hard disk drive (HDD) 2414 (e.g., EIDE, SATA), which internal hard disk drive 2414 may also be configured for external use in a suitable chassis (not shown), a magnetic floppy disk drive (FDD) 2416, (e.g., to read from or write to a removable diskette 2418) and an optical disk drive 2420, (e.g., reading a CD-ROM disk 2422 or, to read from or write to other high capacity optical media such as the DVD). The hard disk drive 2414, magnetic disk drive 2416 and optical disk drive 2420 can be connected to the system bus 2408 by a hard disk drive interface 2424, a magnetic disk drive interface 2426 and an optical drive interface 2428, respectively. The interface 2424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 2412, including an operating system 2430, one or more application programs 2432, other program modules 2434 and program data 2436. All or portions of the operating system, applications, modules, and/or data can also be cached in the RAM 2412. It is to be appreciated that the innovation can be implemented with various commercially available operating systems or combinations of operating systems.

A user can enter commands and information into the computer 2402 through one or more wired/wireless input devices, e.g., a keyboard 2438 and a pointing device, such as a mouse 2440. Other input devices (not shown) may include a microphone, an IR remote control, a joystick, a game pad, a stylus pen, touch screen, or the like. These and other input devices are often connected to the processing unit 2404 through an input device interface 2442 that is coupled to the system bus 2408, but can be connected by other interfaces, such as a parallel port, an IEEE 1394 serial port, a game port, a USB port, an IR interface, etc.

A monitor 2444 or other type of display device is also connected to the system bus 2408 via an interface, such as a video adapter 2446. In addition to the monitor 2444, a computer typically includes other peripheral output devices (not shown), such as speakers, printers, etc.

The computer 2402 may operate in a networked environment using logical connections via wired and/or wireless communications to one or more remote computers, such as a remote computer(s) 2448. The remote computer(s) 2448 can be a workstation, a server computer, a router, a personal computer, portable computer, microprocessor-based entertainment appliance, a peer device or other common network node, and typically includes many or all of the elements described relative to the computer 2402, although, for purposes of brevity, only a memory/storage device 2450 is illustrated. The logical connections depicted include wired/wireless connectivity to a local area network (LAN) 2452 and/or larger networks, e.g., a wide area network (WAN) 2454. Such LAN and WAN networking environments are commonplace in offices and companies, and facilitate enterprise-wide computer networks, such as intranets, all of which may connect to a global communications network, e.g., the Internet.

When used in a LAN networking environment, the computer 2402 is connected to the local network 2452 through a wired and/or wireless communication network interface or adapter 2456. The adaptor 2456 may facilitate wired or wireless communication to the LAN 2452, which may also include a wireless access point disposed thereon for communicating with the wireless adaptor 2456.

When used in a WAN networking environment, the computer 2402 can include a modem 2458, or is connected to a communications server on the WAN 2454, or has other means for establishing communications over the WAN 2454, such as by way of the Internet. The modem 2458, which can be internal or external and a wired or wireless device, is connected to the system bus 2408 via the serial port interface 2442. In a networked environment, program modules depicted relative to the computer 2402, or portions thereof, can be stored in the remote memory/storage device 2450. It will be appreciated that the network connections shown are exemplary and other means of establishing a communications link between the computers can be used.

The computer 2402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 25:
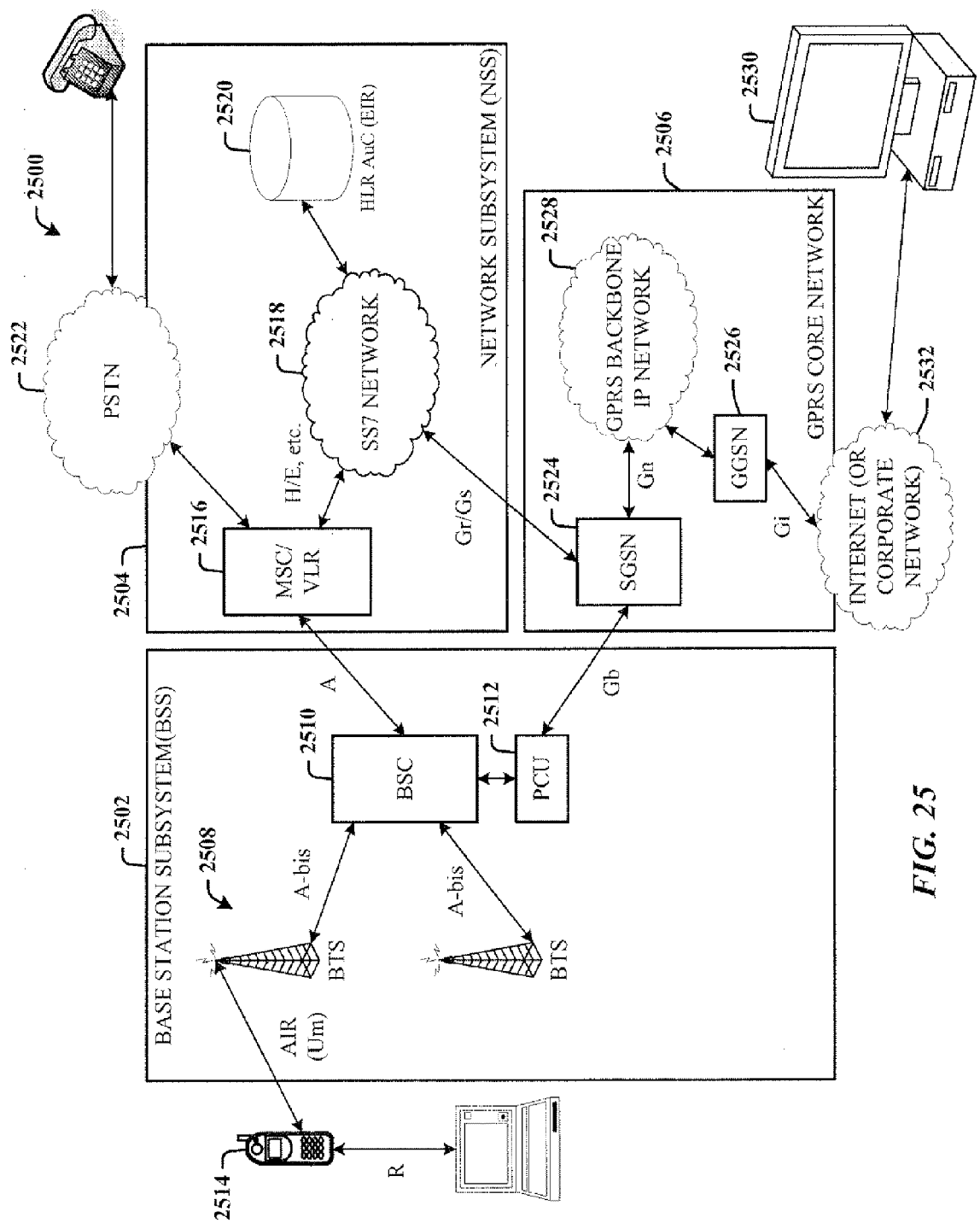
FIG. 25 illustrates an exemplary GSM network that facilitates DMS access control, location-based billing, and E911 mechanisms according to an innovative aspect.

FIG. 25 illustrates an exemplary GSM network 2500 that facilitates DMS access control, location-based billing, and E911 mechanisms according to an innovative aspect. The GSM system, designed as a 2G cellular communications system, utilizes TDMA (time division multiple access) technology to enable greater call capacity. Digitally-encoded speech can also be ciphered to retain call privacy. Voice calls are the primary function of the GSM system. To achieve this, the speech is digitally encoded, and later decoded using a vocoder.

GSM also supports a variety of other data services, although the performance for such data services (e.g., facsimile videotext and teletext) is slow. One data service includes SMS that allows bi-directional messaging, store-and-forward delivery, and alphanumeric messages. The overall system definition for GSM describes not only the air interface, but also the network. GSM uses 200 KHz RF channels, and are typically multiplexed to, for example, enable eight users to access each carrier.

The GSM network 2500 includes a base station subsystem (BSS) 2502, a network subsystem (NSS) 2504 and a GPRS core network 2506. The BSS 2502 can include one or more base transceiver stations (BTS) 2508 and a base station controller (BSC) 2510 connected together on an A-bis interface. The BTS and accompanying base stations (not shown) connect a cell phone to a cellular network. Base stations are all interconnected to facilitate roaming from one cell to another via a process called handover, without losing the cell connection.

A packet control unit (PCU) 2512 is shown connected to the BTS 2510 although the exact position of this can depend on the vendor architecture. The BSS 2502 is connected by the air interface Um to a mobile terminal 2514. The BTS 2508 are the actual transmitters and receivers of radio signals. Typically, a BTS for anything other than a picocell will have several different transceivers (TRXs) which allow it to serve several different frequencies or even several different cells (in the case of sectorized base stations).

By using directional antennae on a base station, each pointing in different directions, it is possible to sectorise the base station so that several different cells are served from the same location. This increases the traffic capacity of the base station (each frequency can carry eight voice channels) while not greatly increasing the interference caused to neighboring cells (in any given direction, only a small number of frequencies are being broadcast).

The BSC 2510 provides the intelligence behind the BTS 2508. Typically, a BSC can have tens or even hundreds of BTSs 2508 under its control. The BSC 2510 handles allocation of radio channels, receives measurements from the mobile phones, and controls handovers from BTS to BTS (except in the case of an inter-MSC handover in which case control is in part the responsibility of the an MSC). One function of the BSC 2510 is to act as a concentrator such that many different low capacity connections to the BTS 2508 can become reduced to a smaller number of connections towards the MSC. Generally, this means that networks are often structured to have many BSCs 2510 distributed into regions near the BTS 2508 which are then connected to large centralized MSC sites.

The PCU 2512 can perform some of the equivalent tasks of the BSC 2510. The allocation of channels between voice and data can be controlled by the base station, but once a channel is allocated to the PCU 2512, the PCU 2512 takes full control over that channel. The PCU 2512 can be built into the base station, built into the BSC, or even in some architectures, it can be at an SGSN site.

The BSS 2502 connects to the NSS 2504 by an A interface. The NSS 2504 is shown containing an MSC 2516 connected via an SS7 network 2518 to an HLR 2520. The AuC and the EIR, although technically separate functions from the HLR 2520, are shown together since combining them can be performed in the network.

The combination of a cell phone 2514 and a SIM card (not shown) creates a special digital "signature" that includes a subscriber number which is sent from the cell phone 2514 to the nearest BTS 2508 asking that the subscriber of a particular network be allowed to use the network. The request is passed on along the network of BTS 2508 to the heart of a cellular network, the MSC 2516. The MSC also routes all incoming and outgoing calls to and from the fixed-line networks or other cellular networks. When the user wants to make an outgoing call, another section of the MSC called the VLR checks whether the caller is actually allowed to make that call. For example, if the caller is barred for international dialing, a message to that effect will be generated by the VLR, sent along the network, and almost instantly back to the cell phone.

The MSC 2516 also contains the component called HLR 2520 that provides the administrative information required to authenticate, register and locate the caller as that network's subscriber. Once the HLR has received a log-on request, the HLR 2520 immediately checks the special "signature" contained in the request against the HLR special subscriber database. If the subscription is current, the MSC 2516 sends a message back to the phone via the network of BTS 2508 that indicates the caller is allowed to access the network. The name or code of that network will appear on the LCD screen of the cell phone 2514. Once this network "name" message appears on the phone LCD screen, it means the caller is connected to the network and able to make and receive calls.

The HLR 2520 registers which base station the cell phone is currently connected to, so that when the network MSC 2516 needs to route an incoming call to the cell phone number, it will first check the HLR 2520 to see where the cell phone is located. Periodically, the cell phone will send a message to the network indicating where it is, in a process called polling. The combination of the tracking function and the caller's unique digital signature allows the MSC 2516 to route that call to the precise base station the cell phone happens to be connected to, and then exclusively to the cell phone, even if a number of other subscribers are simultaneously connected to that base station.

When traveling to another cell while driving, for example, the HLR 2520 is automatically updated, and continues to monitor where exactly it should route the calls should the caller then move within range of another base station. This routing procedure means that out of hundreds of thousands of subscribers, only the correct cell phone will ring when necessary.

The NSS 2504 has a direct connection to the PSTN 2522 from the MSC 2516. There is also a connection to from the NSS 2504 to the GPRS core network 2506 via a Gr/Gs interface although this is optional and not always implemented. The illustrated GPRS Core Network 2506 is simplified to include a SGSN 2524 (connected to the BSS 2502 by the Gb interface) and a GGSN 2526. The SGSN 2524 and the GGSN 2526 are connected together by a private IP network 2528 called a GPRS backbone shown as the Gn reference point. A computer 2530 is depicted as connecting to the core network 2506 via an Internet or corporate network 2532.

Some voice mail systems are linked to a network SMS Center (SMSC), a special facility that handles short messages. The SMSC generates the special SMS message that notifies the caller when they have mail waiting in a Mailbox. SMS messages can be received on an SMS-capable cell phone even while the caller is on a voice call. This is because the SMS messages are sent on a different radio frequency, the GSM data channel, than voice calls, so that the two never interfere.

What has been described above includes examples of claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for controlling radio network access, comprising:
   receiving, from a first broadband endpoint of an unlicensed wireless network having a unique broadband endpoint internet address and associated geographic location, information indicating the geographic location of the first broadband endpoint;
   controlling whether or not to grant access to the radio network by a user through the unlicensed wireless network and the first broadband endpoint based on at least the geographic location of the first broadband endpoint as indicated by the received information;
   billing the user for use of the radio network based on at least the geographic location of the first broadband endpoint, wherein the billing applies a different radio network billing metric if the first broadband endpoint is a home broadband endpoint of the user compared with if the user accesses the radio network from a non-home broadband endpoint.

2. The method of claim 1, wherein the unlicensed wireless network is a broadband IP network, Bluetooth and/or a Wifi network.

3. The method of claim 1, wherein the radio network is a GSM (global system for mobile telecommunications) network.

4. The method of claim 1, further comprising controlling, based on the physical location data, DMS access, dynamic location billing and E911 location determination.

5. The method of claim 1, wherein the billing metric for the first broadband endpoint that is not the home broadband endpoint is greater than zero, and the billing metric for the first broadband endpoint that is the home broadband endpoint is free of charge.

6. A system that facilitates control of radio network access through a first broadband endpoint of an unlicensed wireless network, the first broadband endpoint having a unique broadband endpoint internet address and an associated geographical location, the system comprising
- an access component that controls whether or not to grant access to the radio network by a user through the unlicensed wireless network based on the geographic location of the broadband endpoint;
- a billing component that facilitates billing the user for the use of the radio network wireless network based on the geographic location of the first broadband endpoint, wherein a different radio network billing metric is applied if the first broadband endpoint is a home broadband endpoint of the user compared with if the user accesses from a non-home broadband endpoint.

7. The system of claim 6, wherein the unlicensed wireless network is a broadband IP network, Bluetooth and/or a Wifi network.

8. The system of claim 6, wherein the radio network is a GSM (global system for mobile telecommunications) network.

9. The system of claim 6, further comprising a controller configured to control, based on the physical location data, DMS access, dynamic location billing and E911 location determination.

10. The system of claim 6, wherein the radio network billing metric for the first broadband endpoint that is not the home broadband endpoint is greater than zero, and the radio network billing metric for the first broadband endpoint that is the home broadband endpoint is free of charge.

* * * * *